(12) United States Patent
Kanazawa et al.

(10) Patent No.: US 10,443,901 B2
(45) Date of Patent: Oct. 15, 2019

(54) INDOOR UNIT OF AIR CONDITIONER

(71) Applicant: DAIKIN INDUSTRIES, LTD., Osaka-shi, Osaka (JP)

(72) Inventors: Yukako Kanazawa, Sakai (JP); Junichi Shimoda, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 676 days.

(21) Appl. No.: 14/700,658

(22) Filed: Apr. 30, 2015

(65) Prior Publication Data
US 2016/0320099 A1 Nov. 3, 2016

(51) Int. Cl.
F25B 13/00 (2006.01)
F25B 49/02 (2006.01)
F25B 31/00 (2006.01)

(52) U.S. Cl.
CPC .............. *F25B 13/00* (2013.01); *F25B 49/02* (2013.01); *F25B 31/006* (2013.01); *F25B 2313/0312* (2013.01); *F25B 2313/0314* (2013.01); *F25B 2313/0315* (2013.01); *F25B 2341/065* (2013.01); *F25B 2600/2513* (2013.01); *F25B 2700/1931* (2013.01); *F25B 2700/2106* (2013.01); *F25B 2700/21151* (2013.01); *F25B 2700/21152* (2013.01); *Y02B 30/72* (2013.01)

(58) Field of Classification Search
CPC ...... F25B 2313/0312; F25B 2313/0314; F25B 2341/065
USPC .......................................................... 62/160
See application file for complete search history.

(56) References Cited

U.S. PATENT DOCUMENTS

| 4,987,747 | A | * | 1/1991 | Nakamura | F24F 3/065 62/160 |
| 5,224,354 | A | * | 7/1993 | Ito | F25B 41/062 62/196.3 |
| 5,701,753 | A | * | 12/1997 | Iritani | B60H 1/3205 62/211 |
| 6,581,397 | B1 | * | 6/2003 | Taira | F25B 9/002 62/199 |
| 9,638,447 | B2 | * | 5/2017 | Yamashita | F25B 13/00 |

(Continued)

FOREIGN PATENT DOCUMENTS

| EP |  | 2863153 A1 | * | 4/2015 | ............. F25B 13/00 |
| JP | WO | 2013047828 A1 | * | 4/2013 | ............. F25B 49/02 |

*Primary Examiner* — Filip Zec
(74) *Attorney, Agent, or Firm* — Global IP Counselors, LLP

(57) ABSTRACT

An indoor unit of an air conditioner indicates cooling or heating operation states not obtained from an outdoor unit of the air conditioner. The indoor unit includes an indoor control section having first and second control modes. The second control mode is performed in a case when information ascertained by a second information ascertaining section satisfies a predetermined condition. In the first control mode, the opening degree of the indoor expansion valve is controlled so that the degree of superheat satisfies a predetermined superheat condition. In the second control mode, the opening degree of the indoor expansion valve is controlled such that the opening degree is larger than in the first control mode, or the opening degree of the indoor expansion valve is controlled using a modified first control mode by setting a lower limit opening degree narrowing an adjustable range of the opening degree in the first control mode.

13 Claims, 5 Drawing Sheets

(56) References Cited

U.S. PATENT DOCUMENTS

| | | | |
|---|---|---|---|
| 2009/0165482 A1* | 7/2009 | Ko | F25B 1/10 62/222 |
| 2010/0107665 A1* | 5/2010 | Kawano | F25B 13/00 62/149 |
| 2010/0223940 A1* | 9/2010 | Kotani | F25B 45/00 62/149 |
| 2011/0048055 A1* | 3/2011 | Fujimoto | F25B 1/10 62/324.6 |
| 2011/0203300 A1 | 8/2011 | Rafalovich | |

* cited by examiner

INDOOR UNIT OF AIR CONDITIONER

TECHNICAL FIELD

The present invention relates to an indoor unit of an air conditioner.

BACKGROUND ART

An air conditioner is conventionally used with a configuration where a compressor, an indoor heat exchanger, and an outdoor heat exchanger are connected with each other.

An air conditioner, where using of an expansion valve changes during cooling operation and during heating operation as described in, for example, US 2011/0203300 A1, is proposed as this type of air conditioner. In this air conditioner, reducing of pressure of refrigerant is performed during cooling operation in an indoor expansion valve which is provided in front of an indoor heat exchanger. In addition, reducing of pressure of refrigerant is performed during heating operation in an outdoor expansion valve which is provided in front of an outdoor heat exchanger.

SUMMARY

Problems to be Solved by the Invention

Here, in the conventional air conditioner described above, there is an assumption that there is a configuration where it is possible for an indoor unit and an outdoor unit to communicate. That is, in a case where the states of cooling operation and heating operation are switched in the outdoor unit, the current operation state is ascertained at the indoor unit side using information which indicates the cooling operation state or the heating operation state which is sent from the outdoor unit and control of the opening degree of the indoor expansion valve is performed at the indoor unit side in a case where it is ascertained that there is a cooling operation state.

However, there are cases where information which indicates the cooling operation state or the heating operation state is not sent from the outdoor unit to the indoor unit such as a case where the communication protocol is not supported within the relationship between the outdoor unit and the indoor unit or a case where a configuration where communication is possible is not planned.

In a case where it is not possible for the indoor unit to ascertain the cooling operation state or the heating operation state in this manner, there is a state where, for example, it is difficult for refrigerant which is condensed in the indoor heat exchanger to pass through the indoor expansion valve when switching to the heating operation state at the outdoor unit side is performed while there is a state where the opening degree of the indoor expansion valve is controlled to be small during cooling operation. In this case, there is a concern that there will be an abnormal increase in the pressure of refrigerant on the high pressure side in the refrigerant circuit.

The object of the present invention is carried out in consideration of the points described above and is to propose an indoor unit of an air conditioner where it is possible to suppress abnormal increases in the pressure of refrigerant on the high pressure side during activation of heating operation even in a case where information which indicates the cooling operation state or the heating operation state is not obtained from the outdoor unit side.

Means to Solve the Problems

An indoor unit of an air conditioner according to a first aspect is an indoor unit where information which indicates the cooling operation state or the heating operation state is not obtained from an outdoor unit in an air conditioner where execution is possible by switching between cooling operation and heating operation, where the indoor unit is provided with an indoor heat exchanger, an indoor expansion valve, a first information ascertaining section, a second information ascertaining section, and an indoor control section. The indoor expansion valve is connected to the liquid refrigerant side of the indoor heat exchanger. The first information ascertaining section is for ascertaining a degree of superheat of refrigerant flowing through the gas refrigerant side of the indoor heat exchanger and may be configured from a plurality of sensors but is not particularly limited to this. The second information ascertaining section is for ascertaining at least any of the pressure of refrigerant flowing through the gas refrigerant side of the indoor heat exchanger, a degree of subcooling of refrigerant flowing through the liquid refrigerant side of the indoor heat exchanger, or a pair of the temperatures including the temperature on one side of the indoor expansion valve and the temperature on the other side of the indoor expansion valve, and may be configured from a single sensor or may be configured from a plurality of sensors but is not particularly limited to this. The indoor control section has a first control mode and a second control mode. The second control mode is performed in a case where information which is ascertained by the second information ascertaining section satisfies a predetermined condition. In the first control mode, the indoor control section controls the opening degree of the indoor expansion valve so that the degree of superheat satisfies a predetermined superheat condition. In the second control mode, the indoor control section controls the opening degree of the indoor expansion valve in such a way that an opening degree becomes an opening degree which is larger than the opening degree of the indoor expansion valve which is controlled using the first control mode or controls the opening degree of the indoor expansion valve using a modified first control mode by setting a lower limit opening degree which narrows an adjustable range of the opening degree of the indoor expansion valve in the first control mode.

In this indoor unit of the air conditioner, the indoor control section controls the opening degree of the indoor expansion valve in the first control mode so that the degree of superheat satisfies the predetermined superheat condition. For this reason, it is possible to adjust the evaporation capabilities in the indoor heat exchanger in a case where the indoor heat exchanger functions as an evaporator for refrigerant (during cooling operation).

Then, it is possible for the indoor control section to ascertain changes to a state where the indoor heat exchanger is used as a radiator for refrigerant (the heating operation state), that is, activation of heating operation, by determining whether or not information which is ascertained by the second information ascertaining section satisfies the predetermined condition. In detail, in a case where the second information ascertaining section ascertains the pressure of refrigerant flowing through the gas refrigerant side of the indoor heat exchanger, it is possible to ascertain that discharge refrigerant is starting to be sent from a compressor of the outdoor unit and it is possible for the indoor control section to ascertain that heating operation is activated by detecting a sharp increase in a refrigerant pressure value of refrigerant. In addition, in a case where the second information ascertaining section ascertains the degree of subcooling of refrigerant flowing through the liquid refrigerant side of the indoor heat exchanger, it is possible for the indoor control section to ascertain that heating operation is activated by detecting generation of subcooling degree. Furthermore, in a case where the second information ascertaining section ascertains a pair of the temperatures including the temperature on one side of the indoor expansion valve and the temperature on the other side of the indoor expansion valve, it is possible for the indoor control section to ascertain that heating operation is activated by detecting changes in the relationship between these temperatures (changes such that the temperature on the indoor heat exchanger side of the indoor expansion valve becomes higher than the temperature on the opposite side of the indoor expansion valve).

Then, in a case where the indoor control section ascertains that heating operation is activated as described above, the indoor control section controls opening degree of the indoor expansion valve by performing the second control mode in such a way that an opening degree becomes an opening degree which is larger than the opening degree of the indoor expansion valve which is controlled using the first control mode or controls the opening degree of the indoor expansion valve using the modified first control mode by setting a lower limit opening degree which narrows the adjustable range of the opening degree of the indoor expansion valve in the first control mode. Due to this, it is possible to eliminate a state where refrigerant which is discharged from the compressor of the outdoor unit is excessively retained in the indoor heat exchanger.

Due to the above, it is possible to suppress abnormal increases in the pressure of refrigerant on the high pressure side during activation of heating operation while the indoor control section itself ascertains when heating operation is activated even in a case where information which indicates the cooling operation state or the heating operation state is not obtained from the outdoor unit side.

An indoor unit of an air conditioner according to a second aspect is the indoor unit of the air conditioner according to the first aspect where the indoor control section controls the opening degree of the indoor expansion valve in the second control mode using the modified first control mode by setting the lower limit opening degree which narrows the adjustable range of the opening degree of the indoor expansion valve in the first control mode.

In this indoor unit of the air conditioner, the indoor control section controls the opening degree of the indoor expansion valve in the second control mode within a range of openings which are larger than the lower limit opening degree by setting the lower limit opening degree which narrows the adjustable range of the opening degree of the indoor expansion valve in control of the indoor expansion valve in the first control mode. Due to this, it is possible to more reliably suppress abnormal increases in the pressure of refrigerant on the high pressure side during activation of heating operation since it is never the case that the indoor expansion valve is narrower than the lower limit opening degree.

An indoor unit of an air conditioner according to a third aspect is the indoor unit of the air conditioner according to the second aspect where the indoor control section stipulates the size of the lower limit opening degree which is set in the second control mode according to information which is ascertained by the second information ascertaining section.

In this indoor unit of the air conditioner, the size of the lower limit opening degree of the indoor expansion valve is stipulated according to information which is ascertained by the second information ascertaining section. For this reason, it is possible to suppress abnormal increases in the pressure of refrigerant on the high pressure side according to the circumstances by increasing the lower limit opening degree of the indoor expansion valve in a case where an abnormal increase in the pressure of refrigerant on the high pressure side seems likely to occur during activation of heating operation based on information which is ascertained by the second information ascertaining section.

An indoor unit of an air conditioner according to a fourth aspect is the indoor unit of the air conditioner according to the first aspect where the second information ascertaining section is configured to have a subcooling ascertaining section for ascertaining a degree of subcooling of refrigerant flowing through the liquid refrigerant side of the indoor heat exchanger. The indoor control section determines that the predetermined condition is satisfied in a case where the degree of subcooling of refrigerant flowing through the liquid refrigerant side of the indoor heat exchanger, which is ascertained by the subcooling ascertaining section, is higher than predetermined condition subcooling. In the second control mode which is performed in a case where it is determined that the predetermined condition is satisfied, the indoor control section controls the opening degree of the indoor expansion valve in such a way that an opening degree becomes an opening degree which is larger than the opening degree of the indoor expansion valve which is controlled using the first control mode or controls the opening degree of the indoor expansion valve using the modified first control mode by setting the lower limit opening degree which narrows the adjustable range of the opening degree of the indoor expansion valve in the first control mode.

In this indoor unit of the air conditioner, it is possible for the indoor control section itself to determine that the predetermined condition is satisfied in a case where the degree of subcooling of refrigerant flowing through the liquid refrigerant side of the indoor heat exchanger is higher than predetermined condition subcooling and to ascertain switching to heating operation although information which indicates the cooling operation state or the heating operation state is not obtained from the outdoor unit.

An indoor unit of an air conditioner according to a fifth aspect is the indoor unit of the air conditioner according to the fourth aspect where the indoor control section performs correction to lower the set value of the lower limit opening degree in a case where the degree of subcooling of refrigerant flowing through the liquid refrigerant side of the indoor heat exchanger is smaller than predetermined correction subcooling in a case of performing the second control mode where the opening degree of the indoor expansion valve is controlled using the modified first control mode by setting the lower limit opening degree which narrows the adjustable range of the opening degree of the indoor expansion valve in the first control mode. Predetermined correction subcooling is a value which is smaller than the predetermined condition subcooling. The degree of subcooling of refrigerant flowing through the liquid refrigerant side of the indoor heat exchanger is the degree of subcooling which is ascertained by the subcooling ascertaining section.

In this indoor unit of the air conditioner, the indoor control section performs correction to lower the set value of the lower limit opening degree in a case where the degree of subcooling of refrigerant flowing through the liquid refrigerant side of the indoor heat exchanger is smaller than predetermined correction subcooling. Due to this, it is possible to increase the condensation capabilities in the indoor heat exchanger while securing a certain extent of the degree of subcooling of refrigerant flowing through the liquid refrigerant side of the indoor heat exchanger since it is possible for the opening degree of the indoor expansion valve to be even smaller.

An indoor unit of an air conditioner according to a sixth aspect is the indoor unit of the air conditioner according to the first aspect where the second information ascertaining section is configured to have a gas side refrigerant pressure sensor which detects the pressure of refrigerant flowing through the gas refrigerant side of the indoor heat exchanger. The indoor control section determines that the predetermined condition is satisfied in a case where the pressure of refrigerant detected by the gas side refrigerant pressure sensor exceeds a predetermined pressure. In the second control mode which is performed in a case where it is determined that the predetermined condition is satisfied, the opening degree of the indoor expansion valve is controlled in such a way that an opening degree becomes an opening degree which is larger than the opening degree of the indoor expansion valve which is controlled using the first control mode or the opening degree of the indoor expansion valve is controlled using the modified first control mode by setting the lower limit opening degree which narrows the adjustable range of the opening degree of the indoor expansion valve in the first control mode.

In this indoor unit of the air conditioner, it is possible for the indoor control section itself to determine that the predetermined condition is satisfied in a case where the pressure of refrigerant flowing through the gas refrigerant side of the indoor heat exchanger exceeds the predetermined pressure and to ascertain switching to heating operation although information which indicates the cooling operation state or the heating operation state is not obtained from the outdoor unit.

An indoor unit of an air conditioner according to a seventh aspect is the indoor unit of the air conditioner according to the sixth aspect where there is further provided a subcooling ascertaining section for ascertaining the degree of subcooling of refrigerant flowing through the liquid refrigerant side of the indoor heat exchanger. The indoor control section performs correction to lower the set value of the lower limit opening degree in a case where the degree of subcooling of refrigerant flowing through the liquid refrigerant side of the indoor heat exchanger is smaller than predetermined correction subcooling in a case of performing the second control mode where the opening degree of the indoor expansion valve is controlled using the modified first control mode by setting the lower limit opening degree which narrows the adjustable range of the opening degree of the indoor expansion valve in the first control mode. The degree of subcooling of refrigerant flowing through the liquid refrigerant side of the indoor heat exchanger is ascertained by the subcooling ascertaining section.

In this indoor unit of the air conditioner, the indoor control section performs correction to lower the set value of the lower limit opening degree in a case where the degree of subcooling of refrigerant flowing through the liquid refrigerant side of the indoor heat exchanger is smaller than predetermined correction subcooling. Due to this, it is possible to increase the condensation capabilities in the indoor heat exchanger while securing a certain extent of the degree of subcooling of refrigerant flowing through the liquid refrigerant side of the indoor heat exchanger since it is possible for the opening degree of the indoor heat exchanger to be even smaller.

An indoor unit of an air conditioner according to an eighth aspect is the indoor unit of the air conditioner according to the first aspect where the second information ascertaining section is configured to have both a gas side refrigerant pressure sensor and a subcooling ascertaining section. The gas side refrigerant pressure sensor detects the pressure of refrigerant flowing through the gas refrigerant side of the indoor heat exchanger. The subcooling ascertaining section is for ascertaining the degree of subcooling of refrigerant flowing through the liquid refrigerant side of the indoor heat exchanger and may be configured from a plurality of sensors but is not limited. The indoor control section performs the second control mode when determining that the predetermined condition is satisfied in a case of either a case where the pressure detected by the gas side refrigerant pressure sensor exceeds a predetermined pressure or a case where the degree of subcooling of refrigerant flowing through the liquid refrigerant side of the indoor heat exchanger is higher than predetermined condition subcooling. The degree of subcooling of refrigerant flowing through the liquid refrigerant side of the indoor heat exchanger is ascertained by the subcooling ascertaining section.

In this indoor unit of the air conditioner, the indoor control section performs the second control mode when determining that the predetermined condition is satisfied in a case where the pressure detected by the gas side refrigerant pressure sensor exceeds the predetermined pressure even in a case where the degree of subcooling of refrigerant flowing through the liquid refrigerant side of the indoor heat exchanger is not higher than predetermined condition subcooling. In addition, the indoor control section performs the second control mode when determining that the predetermined condition is satisfied in a case where the degree of subcooling of refrigerant flowing through the liquid refrigerant side of the indoor heat exchanger is higher than predetermined condition subcooling even in a case where the pressure detected by the gas side refrigerant pressure sensor does not exceed the predetermined pressure. Due to this, it is possible for the indoor control section to reliably ascertain switching to heating operation.

An indoor unit of an air conditioner according to a ninth aspect is the indoor unit of the air conditioner according to the eighth aspect where the indoor control section fully opens the opening of the indoor expansion valve in a case where the predetermined condition is satisfied.

In this indoor unit of the air conditioner, it is possible to more reliably perform suppressing of abnormal increases in the pressure of refrigerant on the high pressure side since the indoor control section, which itself ascertains switching to heating operation, controls the opening of the indoor expansion valve to be fully open.

An indoor unit of an air conditioner according to a tenth aspect is the indoor unit of the air conditioner according to the ninth aspect where the indoor control section lowers the set value of the lower limit opening degree in a case where the degree of subcooling of refrigerant flowing through the liquid refrigerant side of the indoor heat exchanger is smaller than predetermined correction subcooling in a state where the opening of the indoor expansion valve is fully open. The degree of subcooling of refrigerant flowing through the liquid refrigerant side of the indoor heat exchanger is ascertained by the subcooling ascertaining section.

In this indoor unit of the air conditioner, the indoor control section performs correction to lower the set value of the lower limit opening degree in a case where the degree of subcooling of refrigerant flowing through the liquid refrigerant side of the indoor heat exchanger is smaller than predetermined correction subcooling. Due to this, it is possible to increase the condensation capabilities in the indoor heat exchanger while securing a certain extent of the degree of subcooling of refrigerant flowing through the liquid refrigerant side of the indoor heat exchanger since it is possible for the opening degree of the indoor heat exchanger to be even smaller.

An indoor unit of an air conditioner according to an eleventh aspect is the indoor unit of the air conditioner according to the first aspect where the first information ascertaining section is configured to have both a gas side refrigerant pressure sensor and a gas side refrigerant temperature sensor. The gas side refrigerant pressure sensor detects the pressure of refrigerant flowing through the gas refrigerant side of the indoor heat exchanger. The gas side refrigerant temperature sensor detects the temperature of refrigerant flowing through the outlet on the gas refrigerant side of the indoor heat exchanger. The indoor control section calculates a value, which is obtained by subtracting the refrigerant saturation temperature corresponding to the refrigerant saturation pressure detected by the gas side refrigerant pressure sensor from the temperature of refrigerant detected by the gas side refrigerant temperature sensor, as the degree of superheat of refrigerant flowing through the gas refrigerant side of the indoor heat exchanger.

In this indoor unit of the air conditioner, it is possible for the indoor control section to ascertain the degree of superheat of refrigerant flowing through the outlet on the gas refrigerant side of the indoor heat exchanger using both the gas side refrigerant pressure sensor and the gas side refrigerant temperature sensor.

An indoor unit of an air conditioner according to a twelfth aspect is the indoor unit of the air conditioner according to the first aspect where there is further provided a superheat condition storage section. The superheat condition storage section stores information of the predetermined superheat condition. The indoor control section controls the opening degree of the indoor expansion valve in the first control mode so that the degree of superheat of refrigerant flowing through the gas refrigerant side of the indoor heat exchanger satisfies the predetermined superheat condition which is stored in the superheat condition storage section.

In this indoor unit of the air conditioner, it is possible for the indoor control section to use the predetermined superheat condition which is stored in the superheat condition storage section as a control condition in a case where the indoor expansion valve is controlled based on the degree of superheat of refrigerant flowing through the gas refrigerant side of the indoor heat exchanger.

Advantageous Effects of the Invention

In the indoor unit of the air conditioner according to the invention of the present application, it is possible to suppress abnormal increases in the pressure of refrigerant on the high pressure side during activation of heating operation while an indoor control section itself ascertains when heating operation is activated even in a case where information which indicates the cooling operation state or the heating operation state is not obtained from an outdoor unit side.

DESCRIPTION OF EMBODIMENTS

An embodiment of an air conditioner according to the present invention will be described below based on the diagrams.

Here, the air conditioner according to the present invention is not limited to the embodiment and modified examples described below and modifications are possible over a range which does not depart from the gist of the invention.

(1) Configuration of Air Conditioner 1

Figure 1:
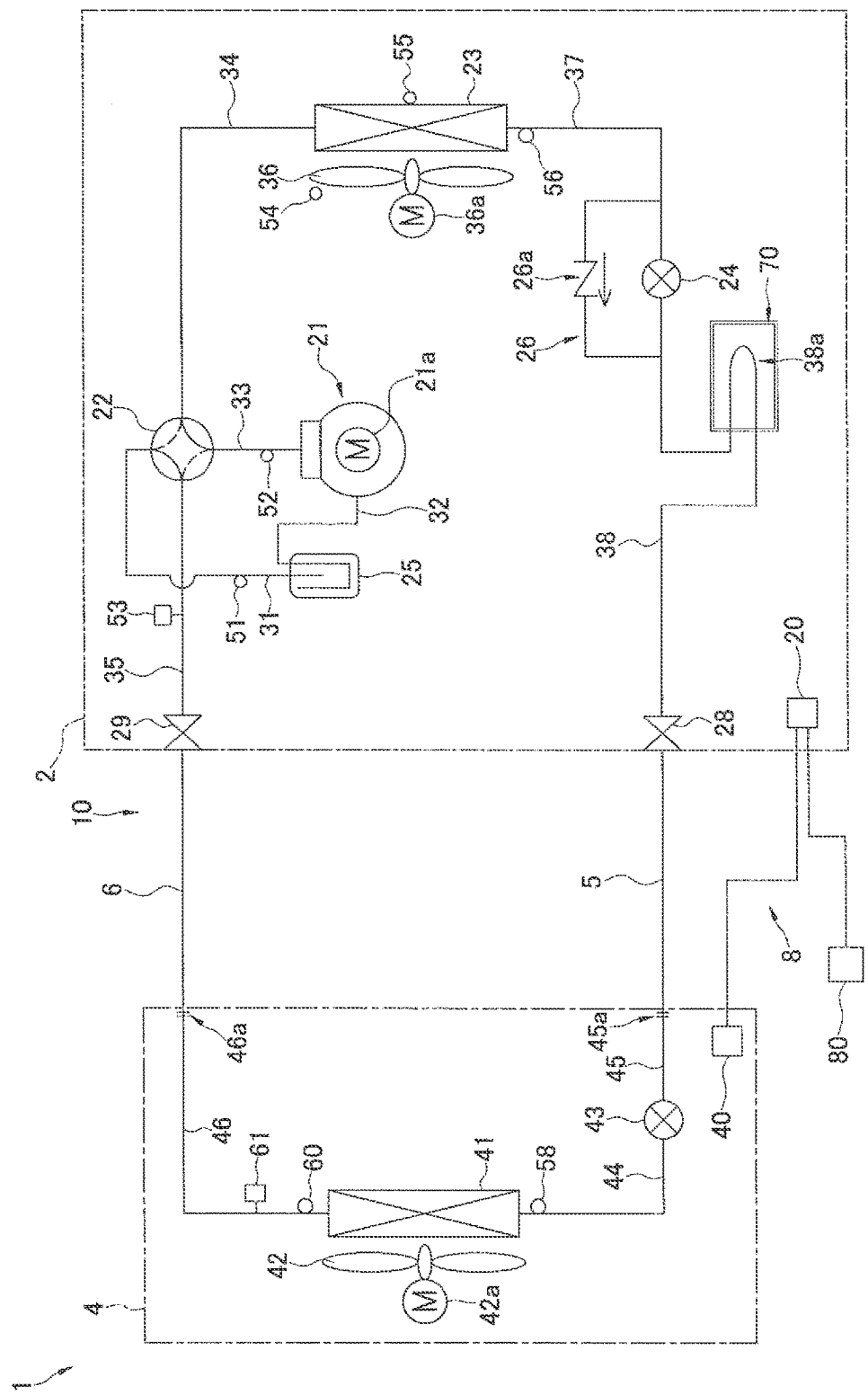
FIG. 1 is outline configuration diagram of an air conditioner according to an embodiment of the present invention.
Figure 2:
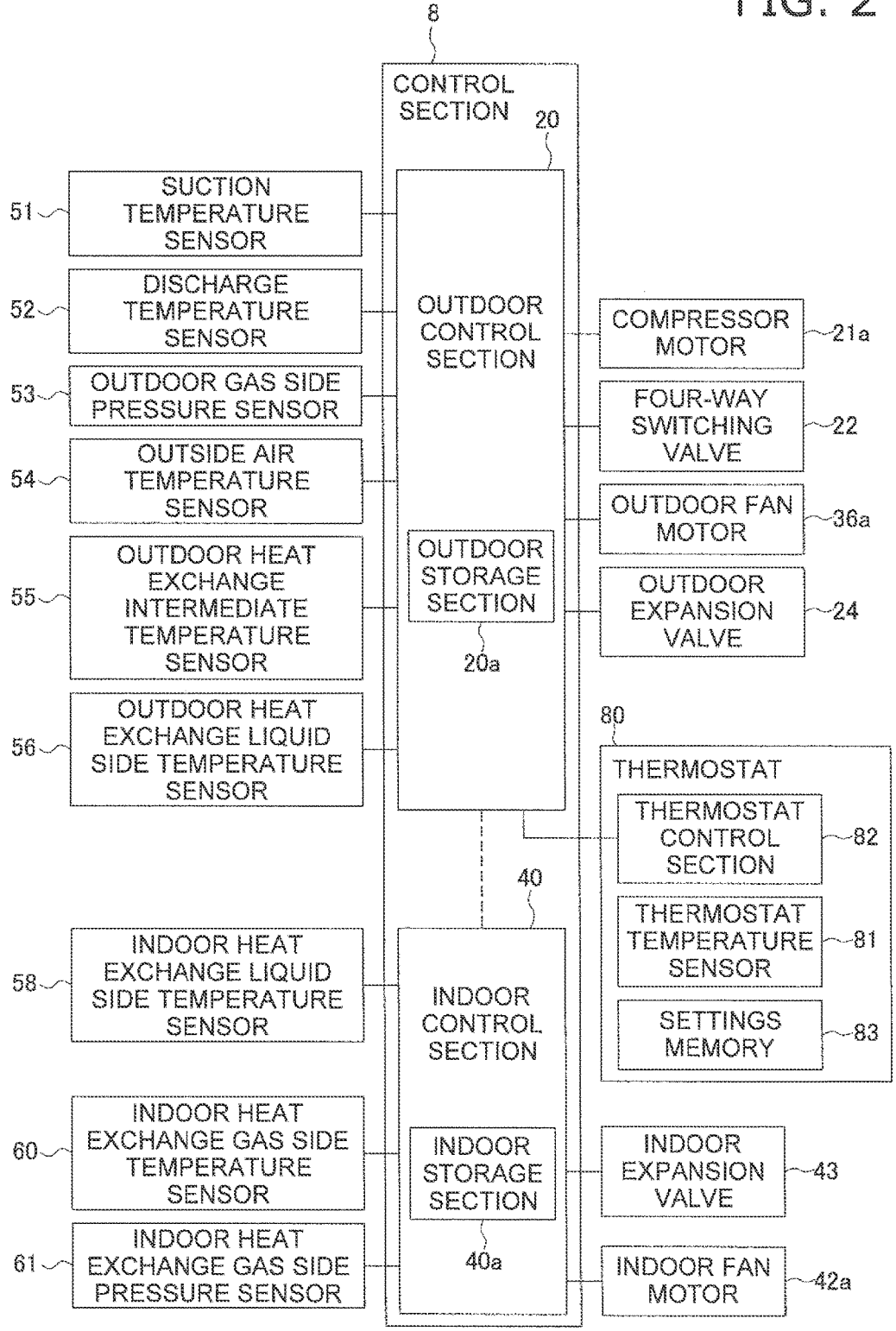
FIG. 2 is a control block diagram for the air conditioner.

FIG. 1 is an outline configuration diagram of an air conditioner 1 according to the present embodiment. FIG. 2 is a control block diagram for the air conditioner 1.

The air conditioner 1 is an apparatus where it is possible to perform cooling and heating indoors such as in a building by performing a vapor compression type of refrigerant cycle.

The air conditioner 1 is configured to mainly have a thermostat 80, an outdoor unit 2, and an indoor unit 4.

Here, it is possible for the indoor unit 4 to only receive specific information from the outdoor unit 2 since the communication protocols differ between the outdoor unit 2 and the indoor unit 4.

Here, the outdoor unit 2 and the indoor unit 4 are connected via a liquid refrigerant communication pipe 5 and a gas refrigerant communication pipe 6. That is, a refrigerant circuit 10 which is a vapor compression type of refrigerant circuit in the air conditioner 1 is configured by connecting the outdoor unit 2 and the indoor unit 4 via the liquid refrigerant communication pipe 5 and the gas refrigerant communication pipe 6.

(1-2) Thermostat 80

The thermostat 80 is a controller for performing commands for control of operation of the air conditioner 1 based on the temperature at a predetermined location inside a building and has a thermostat temperature sensor 81, a thermostat control section 82, a settings memory 83, and the like.

The thermostat temperature sensor 81 detects the temperature of the surroundings at a location where the thermostat 80 is installed.

Various types of settings data which relate to various types of operation conditions such as a cooling operation condition and a heating operation condition are stored in advance in the settings memory 83. The cooling operation condition is not particularly limited and it is possible for, for example, the range of temperatures over which cooling operation is performed in the air conditioner 1 to be the cooling operation condition. In detail, the cooling operation condition may be set in advance to be satisfied as, for example, temperatures which are equal to or lower than a predetermined cooling operation start temperature and temperatures which are equal to or higher than a predetermined cooling operation stop temperature. The same applies to the heating operation condition.

The thermostat control section 82 sends commands for executing operation of the air conditioner 1 in a case where it is determined that the temperature detected by the thermostat temperature sensor 81 matches with the various types of operation conditions which are stored in the settings memory 83. In detail, the thermostat control section 82 sends control commands to an outdoor control section 20 of the outdoor unit 2 which will be described later.

That is, the thermostat control section 82 sends a control command which starts cooling operation to the outdoor control section 20 in a case where the temperature detected by the thermostat temperature sensor 81 satisfies the cooling operation condition and sends a control command which stops cooling operation to the outdoor control section 20 in a case where the temperature detected by the thermostat temperature sensor 81 does not satisfy the cooling operation condition. Here, information on starting and stopping of cooling operation which is ascertained by the outdoor control section 20 is not sent to the indoor control section 40 since the communication protocols differ.

In the same manner, the thermostat control section 82 sends a control command which starts heating operation to the outdoor control section 20 in a case where the temperature detected by the thermostat temperature sensor 81 satisfies the heating operation condition and sends a control command which stops heating operation to the outdoor control section 20 in a case where the temperature detected by the thermostat temperature sensor 81 does not satisfy the heating operation condition. Here, information on starting and stopping of heating operation which is ascertained by the outdoor control section 20 is not sent to the indoor control section 40 since the communication protocols differ.

(1-3) Indoor Unit 4

The indoor unit 4 configures a portion of the refrigerant circuit 10 and is installed in, for example, the basement of a building or the like. Air where air conditioning is carried out by the indoor unit 4 is supplied to one or a plurality of air conditioning target spaces via a duct or the like which is not shown in the diagrams and air conditioning is carried out in the air conditioning target spaces.

The indoor unit 4 has an indoor heat exchanger 41, an indoor fan 42, an indoor fan motor 42*a*, an indoor expansion valve 43, an indoor heat exchange liquid side temperature sensor 58, an indoor heat exchange gas side temperature sensor 60, an indoor heat exchange gas side pressure sensor 61, the indoor control section 40, and the like.

The indoor heat exchanger 41 is a heat exchanger which cools indoor air by functioning as an evaporator for refrigerant during cooling operation and heats indoor air by functioning as a radiator for refrigerant during heating operation.

An indoor gas side refrigerant pipe 46 extends out from the gas side of the indoor heat exchanger 41. An indoor gas side port 46*a* is provided at an edge section, which is on the opposite side to the indoor heat exchanger 41 side, in the indoor gas side refrigerant pipe 46. The gas refrigerant communication pipe 6 is connected with the indoor gas side port 46*a*.

A first indoor liquid side refrigerant pipe 44 extends out from the liquid side of the indoor heat exchanger 41. The indoor expansion valve 43 is provided in the first indoor liquid side refrigerant pipe 44 on the opposite side to the indoor heat exchanger 41 side. The indoor expansion valve 43 is an electric expansion valve where it is possible for the valve opening degree to be controlled and adjusts the extent of the reducing of pressure of refrigerant which passes through the indoor expansion valve 43 according to the valve opening degree.

A second indoor liquid side refrigerant pipe 45 extends out from the indoor expansion valve 43. An indoor liquid side port 45*a* is provided at an edge section, which is on the opposite side to the indoor expansion valve 43 side, in the second indoor liquid side refrigerant pipe 45. The liquid refrigerant communication pipe 5 is connected with the indoor liquid side port 45*a*.

The indoor fan 42 is provided so as to face the indoor heat exchanger 41 and generates an air flow in the outdoor unit 4 in order for air in the surroundings to pass by the indoor heat exchanger 41. Then, the indoor fan 42 supplies air, where air conditioning is carried out after heat exchange with refrigerant in the indoor heat exchanger 41, to the air conditioning target spaces via a duct or the like which is not shown in the diagrams. In the present embodiment, a centrifugal fan, a multi-blade fan, or the like which is driven using the indoor fan motor 42*a* is used as the indoor fan 42.

The indoor heat exchange liquid side temperature sensor 58 detects the temperature of refrigerant at the liquid side of the indoor heat exchanger 41. The indoor heat exchange gas side temperature sensor 60 detects the temperature of refrigerant at the gas side of the indoor heat exchanger 41. The indoor heat exchange gas side pressure sensor 61 detects the pressure of refrigerant at the gas side of the indoor heat exchanger 41. The indoor heat exchange gas side pressure sensor 61 is used in order to read out increases in pressure when heating operation is started in the refrigerant circuit 10 as will be described later, but it is possible to ascertain these increases in pressure swiftly (with excellent responsiveness) due to the indoor heat exchange gas side pressure sensor 61 being provided on the gas side of the indoor heat exchanger 41 and not being provided midway along the indoor heat exchanger 41. These sensors are all connected with the indoor control section 40 and it is possible for the indoor control section 40 to ascertain data detected by each of the sensors.

The indoor control section 40 controls the actions of each section which configures the indoor unit 4. In detail, the indoor control section 40 controls the amount of refrigerant which passes through the indoor expansion valve 43 by controlling the valve opening degree of the indoor expansion valve 43 and controls the air volume of the indoor fan 42 by controlling the indoor fan motor 42*a*. The indoor control section 40 has a microcomputer which is provided in order to perform control of the indoor unit 4, memory such as an indoor storage section 40*a*, and the like.

The indoor control section 40 has the indoor storage section 40*a*. A predetermined superheat condition, which is for performing control of the degree of opening of the indoor expansion valve 43, is stored in the indoor storage section 40*a*. The indoor control section 40 controls the degree of opening of the indoor expansion valve 43 so that the predetermined superheat condition is satisfied.

Here, the indoor control section 40 only receives command signals which are content on controlling driving of the indoor fan motor 42*a* (content on controlling the air volume of the indoor fan 42) from the outdoor control section 20. Here, it is not possible for the indoor control section 40 to receive signals which indicate the outdoor control section 20 switching the refrigerant circuit 10 to the cooling operation state or signals which indicate the outdoor control section 20 switching the refrigerant circuit 10 to the heating operation state since the communication protocol of the indoor control section 40 differs with that of the outdoor control section 20.

Here, in the present embodiment, the indoor unit 4 itself does not have a sensor which detects the air temperature in the air conditioning target spaces.

(1-4) Outdoor Unit 2

The outdoor unit 2 is installed outdoors and configures a portion of the refrigerant circuit 10.

The outdoor unit 2 mainly has a compressor 21, a four way switching valve 22, an outdoor heat exchanger 23, an outdoor fan 36, an outdoor expansion valve 24, a bypass circuit 26, an electrical component cooling section 38a, a gas and liquid separator 25, a liquid side shut-off valve 28, a gas side shut-off valve 29, a suction temperature sensor 51, a discharge temperature sensor 52, an outdoor gas side pressure sensor 53, an outside air temperature sensor 54, an outdoor heat exchange intermediate temperature sensor 55, an outdoor heat exchange liquid side temperature sensor 56, the outdoor control section 20, and the like.

The compressor 21 is a device which compresses low-pressure refrigerant so as to become high-pressure refrigerant in the refrigerant cycle. The compressor 21 has a tightly sealed configuration where a positive displacement compression element (which is not shown in the diagrams) such as a rotary type or a scrolling type is rotationally driven using a compressor motor 21a where it is possible for the frequency (the speed of rotations) to be controlled using an inverter. That is, the compressor 21 is configured so that it is possible to control the driving capacity by changing the frequency (the speed of rotations). The discharge side of the compressor 21 is connected to a discharge pipe 33. The discharge pipe 33 is a refrigerant pipe which connects the discharge side of the compressor 21 and the four way switching valve 22. The suction side of the compressor 21 is connected to a suction pipe 32.

The gas and liquid separator 25 is provided between the suction side of the compressor 21 and the four way switching valve 22. In detail, the gas and liquid separator 25 is connected to the suction pipe 32 on the opposite side to the compressor 21 side. In addition, the gas and liquid separator 25 is also connected with the four way switching valve 22 via a gas and liquid separator introduction pipe 31. Using the gas and liquid separator 25, it is possible for mainly only gas refrigerant, out of refrigerant flowing in from the four way switching valve 22 via the gas and liquid separator introduction pipe 31, to be suctioned into the compressor 21 via the suction pipe 32.

The four way switching valve 22 is a switching valve for switching the direction of the flow of refrigerant in the refrigerant circuit 10. During cooling operation, the four way switching valve 22 performs switching to a cooling cycle state where the outdoor heat exchanger 23 functions as a radiator for refrigerant which is compressed in the compressor 21 and the indoor heat exchanger 41 functions as an evaporator for refrigerant where heat is released in the outdoor heat exchanger 23.

That is, the four way switching valve 22 connects the discharge side of the compressor 21 (here, the discharge pipe 33) and the gas side of the outdoor heat exchanger 23 (here, a first gas refrigerant pipe 34) during cooling operation (refer to the solid line in the four way switching valve 22 in FIG. 1). Moreover, the suction side of the compressor 21 (here, the suction pipe 32, the gas and liquid separator 25, and the gas and liquid separator introduction pipe 31) and the gas refrigerant communication pipe 6 side (here, a second gas refrigerant pipe 35) are connected (refer to the solid line in the four way switching valve 22 in FIG. 1).

In addition, during heating operation, the four way switching valve 22 performs switching to a heating cycle state where the outdoor heat exchanger 23 functions as an evaporator for refrigerant where heat is released in the indoor heat exchanger 41 and the indoor heat exchanger 41 functions as a radiator for refrigerant which is compressed in the compressor 21. That is, the four way switching valve 22 connects the discharge side of the compressor 21 (here, the discharge pipe 33) and the gas refrigerant communication pipe 6 side (here, the second gas refrigerant pipe 35) during heating operation (refer to the dashed line in the four way switching valve 22 in FIG. 1). Moreover, the suction side of the compressor 21 (here, the suction pipe 32, the gas and liquid separator 25, and the gas and liquid separator introduction pipe 31) and the gas side of the outdoor heat exchanger 23 (here, the first gas refrigerant pipe 34) are connected (refer to the dashed line in the four way switching valve 22 in FIG. 1). Here, the first gas refrigerant pipe 34 is a refrigerant pipe which connects the four way switching valve 22 and the gas side of the outdoor heat exchanger 23. The second gas refrigerant pipe 35 is a refrigerant pipe which connects the four way switching valve 22 and the gas side shut-off valve 29.

The outdoor heat exchanger 23 is a heat exchanger which functions as a radiator for refrigerant where outdoor air is a source for cooling during cooling operation and which functions as an evaporator for refrigerant where outdoor air is a source for heating during heating operation. The liquid side of the outdoor heat exchanger 23 is connected to a first liquid refrigerant pipe 37 and the gas side of the outdoor heat exchanger 23 is connected to the first gas refrigerant pipe 34. The first liquid refrigerant pipe 37 is a refrigerant pipe which connects the liquid side of the outdoor heat exchanger 23 and the outdoor expansion valve 24. Here, a second liquid refrigerant pipe 38 is connected to the outdoor expansion valve 24 at the opposite side to the side where the first liquid refrigerant pipe 37 is connected. The second liquid refrigerant pipe 38 extends to the liquid side shut-off valve 28. Here, the liquid refrigerant communication pipe 5 is connected with the liquid side shut-off valve 28.

The bypass circuit 26 is a bypass circuit which connects one side of the outdoor expansion valve 24 to the other side of the outdoor expansion valve 24 in the refrigerant circuit 10. In detail, the bypass circuit 26 connects a portion of the first liquid refrigerant pipe 37 and a portion of the second liquid refrigerant pipe 38. A check valve 26a is provided midway along the bypass circuit 26. The check valve 26a is configured so as to only permit a flow of refrigerant when refrigerant flowing in the first liquid refrigerant pipe 37 is sent toward the second liquid refrigerant pipe 38 and so as not to permit a flow of refrigerant from the second liquid refrigerant pipe 38 side toward the first liquid refrigerant pipe 37 side.

The outdoor expansion valve 24 is a valve which, during heating operation, reduces the pressure of refrigerant whose the pressure has been reduced to an intermediate pressure in the refrigerant cycle in the indoor expansion valve 43, or reduces the pressure of high-pressure refrigerant in the refrigerant cycle when the indoor expansion valve 43 is in a state of being fully open, to a low pressure in the refrigerant cycle. In the present embodiment, the outdoor expansion valve 24 is configured by an electric expansion valve where it is possible to adjust the valve opening degree to a plurality of levels. Here, reducing of pressure of refrigerant using the outdoor expansion valve 24 is not performed during cooling operation since refrigerant flows through the bypass circuit 26 described above.

The electrical component cooling section 38a, which cools an electrical component 70, is provided midway along the second liquid refrigerant pipe 38. In detail, the electrical component cooling section 38a is configured by adjusting the position through which the second liquid refrigerant pipe 38 passes so that it is possible for a portion of the second liquid refrigerant pipe 38 to pass through with thermal contact to the installation position of the electrical component 70. Here, the electrical component 70 is not particularly limited, but, for example, a substrate or the like where a power element or the like, which is included in a component which configures an inverter circuit such as the compressor motor 21a, is mounted. The electric component cooling section 38a may be configured to be provided with a refrigerant jacket which is not shown in the diagrams between the outer surface of the piping and the electrical component 70 and to be able to cool the electrical component 70 via the refrigerant jacket.

The outdoor fan 36 generates an air flow using outdoor air for exhausting to the outside after heat exchange with refrigerant in the outdoor heat exchanger 23 by outside air being suctioned into the outdoor unit 2. Here, a propeller fan or the like which is driven using an outdoor fan motor 36a is used as the outdoor fan 36.

The suction temperature sensor 51 is provided in the gas and liquid separator introduction pipe 31 and detects the temperature of refrigerant which is suctioned from the four way switching valve 22 into the compressor 21 via the gas and liquid separator 25 (temperature of low-pressure refrigerant in the refrigerant cycle). The discharge temperature sensor 52 is provided in the discharge pipe 33 and detects the temperature of high-pressure refrigerant in the refrigerant cycle which is discharged from the compressor 21. The outdoor gas side pressure sensor 53 is provided in the second gas refrigerant pipe 35 and detects the pressure of refrigerant flowing between the four way switching valve 22 and the gas side shut-off valve 29. The outside air temperature sensor 54 detects the temperature of outdoor air which is suctioned into the outdoor unit 2 (the temperature of air before the air is passed through the outdoor heat exchanger 23 and is also referred to as the outside air temperature). The outdoor heat exchange intermediate temperature sensor 55 detects the temperature of refrigerant at an intermediate portion of the outdoor heat exchanger 23. The outdoor heat exchange liquid side temperature sensor 56 detects the temperature of refrigerant at the liquid side of the outdoor heat exchanger 23. These sensors are all connected with the outdoor control section 20 and it is possible for the outdoor control section 20 to ascertain the data detected by each of the sensors.

The outdoor control section 20 controls the actions of each section which configures the outdoor unit 2. In detail, the outdoor control section 20 controls the pressure and amount of circulation of refrigerant in the refrigerant circuit 10 by controlling the driving frequency of the compressor motor 21a, performs control of switching of the connection states of the four way switching valve 22, controls the amount of refrigerant which passes through the outdoor expansion valve 24 by controlling the valve opening degree of the outdoor expansion valve 24, and controls the air volume of the outdoor fan 36 by controlling the outdoor fan motor 36a. The outdoor control section 20 has a microcomputer which is provided in order to perform control of the outdoor unit 2, memory such as an outdoor storage section 20a, the electrical component 70, and the like.

Here, the outdoor control section 20 only transmits command signals which are content on controlling driving of the indoor fan motor 42a (content on controlling the air volume of the indoor fan 42) to the indoor control section 40. Here, it is not possible for the outdoor control section 20 to transmit signals which indicate the outdoor control section 20 switching the refrigerant circuit 10 to the cooling operation state or signals which indicate the outdoor control section 20 switching the refrigerant circuit 10 to the heating operation state since the communication protocol of the outdoor control section 20 differs with that of the indoor control section 40.

Here, the outdoor control section 20 is connected to be able to communicate with the thermostat control section 82 of the thermostat 80 and it is possible to receive various types of control commands from the thermostat control section 82.

(1-5) Liquid Refrigerant Communication Pipe 5 and Gas Refrigerant Communication Pipe 6

The liquid refrigerant communication pipe 5 and the gas refrigerant communication pipe 6 are refrigerant pipes which are built on location when the air conditioner 1 is installed, and pipes which have various lengths and pipe diameters are used according to the instillation conditions of the outdoor unit 2 and the indoor unit 4.

(1-6) Control Section 8

It is possible for the air conditioner 1 to perform operation control of each of the devices of the outdoor unit 2 and the indoor unit 4 using a control section 8 which is configured from the indoor control section 40 and the outdoor control section 20. That is, the control section 8 is configured to perform operation control of the entirety of the air conditioner 1 which includes refrigerant cycle operation such as cooling operation and heating operation using the indoor control section 40 and the outdoor control section 20. The control section 8 is connected as shown in FIG. 2 so that it is possible to receive control commands from the thermostat 80 and signals which are detected using each type of the sensors 51 to 56, 58, 60, and 61 and the like and is connected so that it is possible to control each type of device, the valves 21a, 22, 24, 36a, 42a, and 43, and the like based on these control commands and signals.

As above, the air conditioner 1 includes the refrigerant circuit 10 which is configured by connecting the compressor 21, the radiator, the expansion valve (here, the indoor expansion valve 43 and/or the outdoor expansion valve 24), and the evaporator.

(2) Basic Actions of Air Conditioner

Next, the basic actions of the air conditioner 1 will be described.

It is possible for the air conditioner 1 to perform cooling operation, which is refrigerant cycle operation where indoor cooling is performed by causing the indoor heat exchanger 41 to function as an evaporator for refrigerant, and heating operation, which is refrigerant cycle operation where indoor heating is performed by causing the indoor heat exchanger 41 to function as a radiator for refrigerant, as basic actions. In addition, the air conditioner 1 can temporarily perform defrosting operation for melting frost which is attached to the outdoor heat exchanger 23 in a case where frost formation is generated on the outdoor heat exchanger 23 during heating operation. Here, these basic actions are performed using the control section 8.

(2-1) Cooling Operation (First Control Mode)

Cooling operation in the air conditioner 1 is started due to the outdoor control section 20 receiving a command to start cooling operation which is sent from the thermostat control section 82 in a case where the thermostat control section 82 of the thermostat 80 determines that a cooling operation condition is satisfied based on the temperature detected by the thermostat temperature sensor 81.

Here, as described above, the indoor control section 40 only receives command signals which are content on controlling driving of the indoor fan motor 42a (content on controlling the air volume of the indoor fan 42) from the outdoor control section 20, and it is not possible for the indoor control section 40 to receive signals which indicate the outdoor control section 20 switching the refrigerant circuit 10 to the cooling operation state or signals which indicate the outdoor control section 20 switching the refrigerant circuit 10 to the heating operation state. For this reason, the indoor control section 40 does not ascertain the cooling operation state or the heating operation state using signals from the outdoor control section 20.

The outdoor control section 20 which receives a command to start cooling operation from the thermostat control section 82 switches the four way switching valve 22 to the cooling cycle state (the state which is indicated by the solid line in FIG. 1), makes the outdoor expansion valve 24 fully open, drives the compressor 21 and drives the outdoor fan motor 36a.

Here, the outdoor control section 20 sends the content on controlling driving of the indoor fan motor 42a (a command for the fan wind amount level) to the indoor control unit 40.

Low-pressure gas refrigerant in the refrigerant cycle in the refrigerant circuit 10 is suctioned into the compressor 21 and is discharged after being compressed to a high pressure in the refrigerant cycle.

The high-pressure gas refrigerant which is discharged from the compressor 21 is sent to the outdoor heat exchanger 23 via the four way switching valve 22.

The high-pressure gas refrigerant which is sent to the outdoor heat exchanger 23 becomes high-pressure liquid refrigerant due to heat being released by performing heat exchange in the outdoor heat exchanger 23 with outdoor air which is supplied as a source for cooling using the outdoor fan 36.

The high-pressure liquid refrigerant where heat is released in the outdoor heat exchanger 23 passes through the bypass circuit 26 without passing through the outdoor expansion valve 24 and cools the electrical component 70 by flowing through the electrical component cooling section 38a.

The refrigerant which passes through the electrical component cooling section 38a is sent to the indoor expansion valve 43 via the liquid side shut-off valve 28 and the liquid refrigerant communication pipe 5, and there, the pressure of the refrigerant is reduced to a low pressure in the refrigerant cycle in the indoor expansion valve 43 and the refrigerant is sent to the indoor heat exchanger 41 as refrigerant in a state of two phases of gas and liquid.

Here, the indoor control section 40 performs control of the valve opening degree of the indoor expansion valve 43. In detail, the indoor control section 40 controls the valve opening degree of the indoor expansion valve 43 in such a way that the degree of superheat of refrigerant flowing through the outlet of the indoor heat exchanger 41 (the gas side of the indoor heat exchanger 41 in cooling operation) becomes the indoor target superheat (so that the predetermined superheat condition is satisfied). In more detail, the indoor control section 40 controls so that the valve opening degree of the indoor expansion valve 43 is raised in a case where the degree of superheat of refrigerant flowing through the gas side of the indoor heat exchanger 41 is higher than the indoor target superheat and controls so that the valve opening degree of the indoor expansion valve 43 is lowered in a case where the degree of superheat of refrigerant flowing through the gas side of the indoor heat exchanger 41 is lower than the indoor target superheat. The indoor target superheat is not particularly limited but is specified as specific superheat between four degrees and eight degrees and is stored in advance in the indoor storage section 40a which is held in the indoor control section 40. In the present embodiment, the indoor control section 40 performs control of the degree of opening of the indoor expansion valve 43 in such a way that the degree of superheat at the outlet of the indoor heat exchanger 41 becomes the indoor target superheat using the temperature detected by the indoor heat exchange gas side temperature sensor 60 and the pressure detected by the indoor heat exchange gas side pressure sensor 61. Although not particularly limited, the indoor control section 40 performs control of the degree of opening of the indoor expansion valve 43 in such a way that, in detail, the degree of superheat, which is obtained by subtracting a refrigerant saturation temperature corresponding to the pressure detected by the indoor heat exchange gas side pressure sensor 61 from the temperature detected by the indoor heat exchange gas side temperature sensor 60, becomes the indoor target superheat.

Here, as will be described later, control of the degree of opening of the indoor expansion valve 43 which is performed by the indoor control section 40 (control so that the degree of superheat of refrigerant flowing through the gas side of the indoor heat exchanger 41 becomes the indoor target superheat) is also performed during heating operation and is performed without distinguishing between cooling operation and heating operation, but a lower limit opening degree for control of the indoor expansion valve 43 is set during heating operation.

The low-pressure refrigerant in a state of two phases of gas and liquid which is sent to the indoor heat exchanger 41 evaporates in the indoor heat exchanger 41 by performing heat exchange with indoor air which is supplied as a source for heating using the indoor fan 42. Due to this, air where air conditioning for cooling is carried out is obtained and supplied to the air conditioning target spaces via a duct or the like which is not shown in the diagrams.

Here, the wind amount of the indoor fan 42 is controlled by the indoor control section 40 adjusting the level of driving of the indoor fan motor 42a based on the content on controlling driving of the indoor fan motor 42a (a command for the fan wind amount level) which is received from the outdoor control section 20.

The low-pressure gas refrigerant which evaporates in the indoor heat exchanger 41 is suctioned again into the compressor 21 via the gas refrigerant communication pipe 6, the gas side shut-off valve 29, the four way switching valve 22, and the gas and liquid separator 25.

(2-2) Heating Operation (Second Control Mode)

Heating operation (normal heating control mode) in the air conditioner 1 is started due to the outdoor control section 20 receiving a command to start heating operation which is sent from the thermostat control section 82 in a case where the thermostat control section 82 of the thermostat 80 determines that a heating operation condition is satisfied based on the temperature detected by the thermostat temperature sensor 81.

Here, as described above, the indoor control section 40 only receives command signals which are content on controlling driving of the indoor fan motor 42a (content on controlling the air volume of the indoor fan 42) from the outdoor control section 20, and it is not possible for the indoor control section 40 to receive signals which indicate the outdoor control section 20 switching the refrigerant circuit 10 to the cooling operation state or signals which indicate the outdoor control section 20 switching the refrigerant circuit 10 to the heating operation state. For this reason, the indoor control section 40 does not ascertain the cooling operation state or the heating operation state using signals from the outdoor control section 20.

Here, as will be described later, the indoor control section 40 ascertains that heating operation is started (that heating operation is activated) due to the refrigerant circuit 10 being switched to the heating operation state (due to the four way switching valve 22 being switched to a connecting state) due to satisfying of either the pressure detected by the indoor heat exchange gas side refrigerant pressure sensor 61 exceeding a predetermined pressure or the degree of subcooling of refrigerant flowing through the liquid refrigerant outlet of the indoor heat exchanger 41 being higher than a first subcooling (predetermined condition subcooling). Here, the value of the predetermined pressure and the value of predetermined the first subcooling are stored in the indoor storage section 40a.

In this manner, the indoor control section 40 itself ascertains that heating operation is started based on the values from each type of sensor which is connected with the indoor control section 40 instead of ascertaining that heating operation is started using commands from the outdoor control section 20.

The outdoor control section 20 which receives a command to start heating operation from the thermostat control section 82 drives the compressor 21 and drives the outdoor fan motor 36a by setting a state where the four way switching valve 22 is switched to the heating cycle state (the state which is indicated by the dashed line in FIG. 1) with control of the degree of superheat of the outdoor expansion valve 24.

Here, the outdoor control section 20 sends the content on controlling driving of the indoor fan motor 42a (a command for the fan wind amount level) to the indoor control unit 40.

Low-pressure gas refrigerant in the refrigerant cycle in the refrigerant circuit 10 is suctioned into the compressor 21 and is discharged after being compressed to a high pressure in the refrigerant cycle.

The high-pressure gas refrigerant which is discharged from the compressor 21 is sent to the indoor heat exchanger 41 via the four way switching valve 22, the gas side shut-off valve 29, and the gas refrigerant communication pipe 6.

The high-pressure gas refrigerant which is sent to the indoor heat exchanger 41 becomes high-pressure liquid refrigerant in the indoor heat exchanger 41 due to heat being released by performing heat exchange with indoor air which is supplied as a source for cooling using the indoor fan 42. Due to this, air where air conditioning for heating is carried out is obtained and supplied to the air conditioning target spaces via a duct or the like which is not shown in the diagrams.

Here, the wind amount of the indoor fan 42 is controlled by the indoor control section 40 adjusting the level of driving of the indoor fan motor 42a based on the content on controlling driving of the indoor fan motor 42a (a command for the fan air volume level) which is received from the outdoor control section 20.

The pressure of the high-pressure liquid refrigerant where heat is released in the indoor heat exchanger 41 is reduced to an intermediate pressure in the refrigerant cycle in a case where the degree of opening of the indoor expansion valve 43 is not fully open and the high-pressure liquid refrigerant passes through the indoor expansion valve 43 without the pressure being particularly reduced in a case where the degree of opening of the indoor expansion valve 43 is fully open.

Here, the indoor control section 40 performs control of the valve opening degree of the indoor expansion valve 43. The indoor control section 40 performs control of the valve opening degree of the indoor expansion valve 43 in such a way that the degree of superheat of refrigerant flowing through the gas side of the indoor heat exchanger 41 becomes the indoor target superheat as described above irrespective of cooling operation or heating operation. Here, in a state of being switched to the heating state, the degree of superheat of refrigerant flowing through the gas side of the indoor heat exchanger 41 is raised since heat is not released from refrigerant which is discharged from the compressor 21 and the refrigerant is sent on practically without any change on the gas side of the indoor heat exchanger 41. Accordingly, the indoor control section 40 performs control of the degree of opening of the indoor expansion valve 43 in such a way that the valve opening degree of the indoor expansion valve 43 is raised in order to lower the degree of superheat of refrigerant flowing through the gas side of the indoor heat exchanger 41 where the degree of superheat is excessively raised (here, control by the indoor control section 40 as described above is also continued so that there is control where the valve opening degree of the expansion valve 43 is raised in a case where the degree of superheat of refrigerant flowing through the gas side of the indoor heat exchanger 41 is higher than the indoor target superheat).

Here, the indoor control section 40 performs control of the valve opening degree of the indoor expansion valve 43 in such a way that the degree of superheat of refrigerant flowing through the gas side of the indoor heat exchanger 41 becomes the indoor target superheat as described above and sets the lower limit opening degree to the adjustable range of the degree of opening of the indoor expansion valve 43 in a case where satisfying of either the pressure detected by the indoor heat exchange gas side refrigerant pressure sensor 61 exceeding the predetermined pressure or the degree of subcooling of refrigerant flowing through the outlet on the liquid side of the indoor heat exchanger 41 being higher than the predetermined first subcooling is ascertained.

Here, the adjustable range of the degree of opening of the indoor expansion valve 43 is specified in advance depending on the properties of the indoor expansion valve 43 itself. Then, setting of the lower limit opening degree refers to cases of setting a lower limit which differs to the lower limit for the adjustable range of the degree of opening of the indoor expansion valve 43.

Then, the indoor control section 40 performs correction of the lower limit opening degree which is set here according to the degree of subcooling of refrigerant flowing through the liquid side of the indoor heat exchanger 41. In detail, the indoor control section 40 performs correction of the lower limit opening degree according to the magnitude of the degree of subcooling, which is obtained by subtracting the temperature detected by the indoor heat exchange liquid side temperature sensor 58 from the refrigerant saturation temperature corresponding to the pressure detected by the indoor heat exchange gas side refrigerant pressure sensor 61, for each predetermined time interval and performs control of the degree of opening of the indoor expansion valve 43 by updating the lower limit opening degree.

In this manner, it is possible to suppress abnormal increases in pressure to a high pressure during activation of heating operation in the indoor heat exchanger 41 and on its upstream side since it is possible to more reliably raise the degree of opening for control of the indoor expansion valve 43 due to the indoor control section 40 setting the lower limit opening degree in control of the valve opening degree of the indoor expansion valve 43 during heating operation.

Then, the refrigerant which passes through the indoor expansion valve 43 passes through the liquid refrigerant communication pipe 5, the liquid side shut-off valve 28, and the second liquid refrigerant pipe 38. The refrigerant flowing through the second liquid refrigerant pipe 38 cools the electric component 70 when flowing through the electric component cooling section 38a.

The pressure of the refrigerant passing through the electric component cooling section 38a is reduced to a low pressure in the refrigerant cycle in the outdoor expansion valve 24 and the refrigerant becomes refrigerant in a state of two phases of gas and liquid.

Here, the degree of opening of the outdoor expansion valve 24 is controlled by the outdoor control section 20. In detail, the outdoor control section 20 controls the valve opening degree of the outdoor expansion valve 24 (controls superheat) so that the degree of superheat of refrigerant flowing through the outlet of the outdoor heat exchanger 23 (the gas side of the outdoor heat exchanger 23 and the suction side of the compressor 21 in heating operation) is maintained at an outdoor target superheat. The outdoor target superheat is not particularly limited but is specified as specific the degree of superheat between four degrees and eight degrees and is stored in advance in the outdoor storage section 20a which is held in the outdoor control section 20. In the present embodiment, the outdoor control section 20 performs control of the degree of opening of the outdoor expansion valve 24 so that the degree of superheat at the outlet of the outdoor heat exchanger 23 is maintained at the outdoor target superheat using the temperature detected by the outdoor heat exchange intermediate temperature sensor 55 and the temperature detected by the suction temperature sensor 51. Although not particularly limited, the outdoor control section 20 performs control of the degree of opening of the outdoor expansion valve 24 so that, in detail, the degree of superheat, which is obtained by subtracting the temperature detected by the outdoor heat exchange intermediate temperature sensor 55 from the temperature detected by the suction temperature sensor 51, is maintained at the outdoor target superheat.

In this manner, it is possible to increase the evaporation capabilities by realizing the circumstances where heat exchange is efficiently performed in the outdoor heat exchanger 23 due to the degree of superheat in the outdoor expansion valve 24 being controlled during heating operation.

Then, the low-pressure refrigerant in a state of two phases of gas and liquid where the pressure is reduced by the outdoor expansion valve 24 becomes low-pressure gas refrigerant in the outdoor heat exchanger 23 due to evaporation by performing heat exchange with outdoor air which is supplied as a source for heating using the outdoor fan 36.

The low-pressure refrigerant which evaporates in the outdoor heat exchanger 23 is suctioned again into the compressor 21 via the four way switching valve 22 and the gas and liquid separator 25.

(2-3) Defrost Operation

Defrost operation is performed in a case where a predetermined defrost start condition (for example, a condition such as a case where the temperature detected by the outside air temperature sensor 54 is equal to or less than a predetermined temperature) is satisfied, and refrigerant cycle operation is performed in the same manner as cooling operation by switching the four way switching valve 22 to a cooling cycle state (the state which is indicated by the solid line in FIG. 1) in the same manner as in cooling operation. Here, defrost operation is different to cooling operation and melting of frost which is attached to the outdoor heat exchanger 23 is promoted due to a state where the outdoor fan 36 is stopped.

Figure 3:
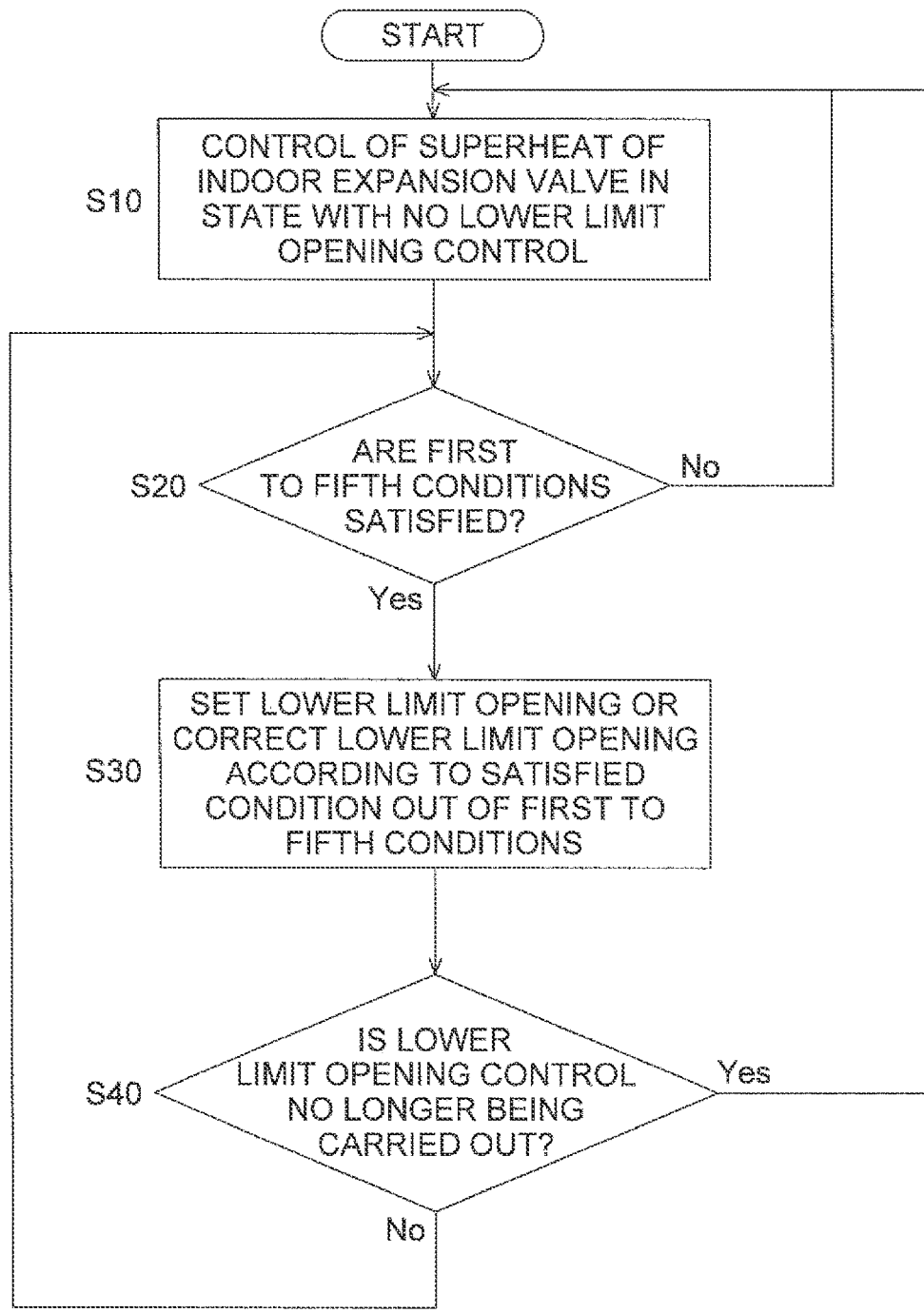
FIG. 3 is a control flow chart using an indoor control section.

(3) Control of Opening Degree of Indoor Expansion Valve During Heating Using Indoor Control Section Control of the opening degree of the indoor expansion valve 43 during heating using the indoor control section 40 will be described below based on the flow chart in FIG. 3 with an example of a case where the refrigerant circuit 10 is switched from the cooling operation state to the heating operation state.

In step S10, the indoor expansion valve 43 is controlled in a state where the lower limit opening degree for control of the indoor expansion valve 43 is not provided in a state where cooling operation is being performed.

Here, the indoor control section 40 performs control which is executed irrespective of the states of cooling operation or heating operation, that is, control where the valve opening degree of the indoor expansion valve 43 is adjusted in such a way that the degree of superheat of refrigerant flowing through the gas side of the indoor heat exchanger 41 becomes the indoor target superheat. In detail, the indoor control section 40 performs control of the degree of opening of the indoor expansion valve 43 in such a way that the degree of superheat, which is obtained by subtracting the refrigerant saturation temperature corresponding to the pressure detected by the indoor heat exchange gas side refrigerant pressure sensor 61 from the temperature of refrigerant detected by the indoor heat exchange gas side refrigerant temperature sensor 60, becomes the indoor target superheat.

In step S20, the indoor control section 40 determines whether or not any of the conditions are satisfied in order of a first condition (predetermined condition), a second condition (predetermined condition), a third condition (predetermined condition), a fourth condition, and a fifth condition. Here, the flow moves to step S20 in a case where there is a condition which is satisfied first out of any of the first to fifth conditions. The flow reverts to step S10 in a case where none of the conditions are satisfied and control of the degree of opening of the indoor expansion valve 43 is continued in a state where there is no lower limit opening degree control. Here, a series of processes are repeated over a predetermined time interval (for example, an interval of ten seconds) in a case where the series of processes of step S20, step S30, and step S40 are repeated. Here, information on the first to fifth conditions is stored in advance in the indoor storage section 40a.

In detail, the indoor control section 40 first determines whether or not the first condition (predetermined condition) is satisfied. In determining whether or not the first condition is satisfied, the indoor control section 40 determines whether or not either the pressure detected by the indoor heat exchange gas side refrigerant pressure sensor 61 exceeding the predetermined pressure (30 $kg/cm^2G$ in the present embodiment but no particularly limited) or the degree of subcooling of refrigerant flowing through the outlet on the liquid side of the indoor heat exchanger 41 being higher than predetermined first subcooling (predetermined condition subcooling) is satisfied. Predetermined first subcooling is not particularly limited and is 15 degrees in the present embodiment. In a case where the first condition is satisfied, the flow moves to step S30 in accompaniment with the information that the first condition is satisfied.

Next, in a case where the first condition is not satisfied, the indoor control section 40 determines whether or not the second condition (predetermined condition) is satisfied. In determining whether or not the second condition is satisfied, the indoor control section 40 determines whether or not the degree of subcooling of refrigerant flowing through the outlet on the liquid side of the indoor heat exchanger 41 being higher than predetermined second subcooling (predetermined condition subcooling) is satisfied. Predetermined second subcooling is not particularly limited and is ten degrees in the present embodiment. In a case where the second condition is satisfied, the flow moves to step S30 in accompaniment with the information that the second condition is satisfied.

Next, in a case where the second condition is not satisfied, the indoor control section 40 determines whether or not the third condition (predetermined condition) is satisfied. In determining whether or not the third condition is satisfied, the indoor control section 40 determines whether or not the degree of subcooling of refrigerant flowing through the outlet on the liquid side of the indoor heat exchanger 41 being higher than predetermined third subcooling (predetermined condition subcooling) is satisfied. Predetermined third subcooling is not particularly limited and is five degrees in the present embodiment. In a case where the third condition is satisfied, the flow moves to step S30 in accompaniment with the information that the third condition is satisfied.

Next, in a case where the third condition is not satisfied, the indoor control section 40 determines whether or not the fourth condition is satisfied. In determining whether or not the fourth condition is satisfied, the indoor control section 40 determines whether or not the degree of subcooling of refrigerant flowing through the outlet on the liquid side of the indoor heat exchanger 41 being smaller than predetermined fourth subcooling (predetermined correction subcooling) is satisfied. Predetermined fourth subcooling is not particularly limited and is two degrees in the present embodiment. In a case where the fourth condition is satisfied, the flow moves to step S30 in accompaniment with the information that the fourth condition is satisfied.

Next, in a case where the fourth condition is not satisfied, the indoor control section 40 determines whether or not the fifth condition is satisfied. In determining whether or not the fifth condition is satisfied, the indoor control section 40 determines whether or not the degree of subcooling of refrigerant flowing through the outlet on the liquid side of the indoor heat exchanger 41 being smaller than predetermined fifth subcooling (predetermined correction subcooling) is satisfied. Predetermined fifth subcooling is not particularly limited and is three degrees in the present embodiment. In a case where the fifth condition is satisfied, the flow moves to step S30 in accompaniment with the information that the fifth condition is satisfied.

Finally, in a case where the fifth condition is not satisfied, the flow reverts to step S10 and the indoor control section 40 continues control of the degree of opening of the indoor expansion valve 43 in a state where there is no lower limit opening degree control since it is the case that none of the conditions are satisfied.

In step S30, the indoor control section 40 performs processes corresponding to any of the first to fifth conditions which are satisfied in the immediately prior process in step S20. Here, the lower limit opening degree is set in a case where a process where the lower limit opening degree is increased is performed in a state where there is no lower limit opening degree control. In addition, information to each process in the cases where the first to fifth conditions are satisfied is stored in advance in the indoor storage section 40*a*.

In detail, in a case where it is determined that the first condition (predetermined condition) is satisfied in the immediately prior process in step S20, the indoor control section 40 sets the lower limit opening degree of the indoor expansion valve 43 to be an degree of opening where the indoor expansion valve 43 is fully open since the pressure of refrigerant on the gas side of the indoor heat exchanger 41 is excessively high or the degree of subcooling is excessively high due to refrigerant being retained in the indoor heat exchanger 41 being excessive (flow is excessively difficult). Due to this, it is possible to suppress abnormal increases in the pressure of refrigerant on the gas side of the indoor heat exchanger 41 and to reduce the extent of refrigerant being retained in the indoor heat exchanger 41.

In a case where it is determined that the second condition (predetermined condition) is satisfied in the immediately prior process in step S20, the indoor control section 40 raises the lower limit opening degree of the indoor expansion valve 43 by a predetermined second opening degree (raised by an extent of approximately 6% of a fully open opening in the present embodiment but not particularly limited to this) since the degree of subcooling is high due to the extent of refrigerant being retained in the indoor heat exchanger 41 being excessively high. Due to this, it is possible to reduce the extent of refrigerant being retained in the indoor heat exchanger 41.

In a case where it is determined that the third condition (predetermined condition) is satisfied in the immediately prior process in step S20, the indoor control section 40 raises the lower limit opening degree of the indoor expansion valve 43 by a predetermined third opening degree (raised by an extent of approximately 4% of a fully open opening in the present embodiment but not particularly limited to this) since the degree of subcooling is slightly high due to the extent of refrigerant being retained in the indoor heat exchanger 41 is slightly high (flow is difficult). Due to this, it is possible to reduce the extent of refrigerant being retained in the indoor heat exchanger 41. Here, the predetermined third opening degree is set to be smaller than the predetermined second opening degree since the extent of refrigerant being retained in the indoor heat exchanger 41 is smaller in a case where the third condition is satisfied compared to a case where the second condition is satisfied.

In a case where it is determined that the fourth condition is satisfied in the immediately prior process in step S20, the indoor control section 40 lowers the lower limit opening degree of the indoor expansion valve 43 by a predetermined fourth opening degree (lowered by an extent of approximately 20% of a fully open opening in the present embodiment but not particularly limited to this) since the extent of refrigerant being retained in the indoor heat exchanger 41 is excessively low (flow is excessively easy). Due to this, it is possible to increase the extent of refrigerant being retained in the indoor heat exchanger 41.

In a case where it is determined that the fifth condition is satisfied in the immediately prior process in step S20, the indoor control section 40 lowers the lower limit opening degree of the indoor expansion valve 43 by a predetermined fifth opening degree (lowered by an extent of approximately 6% of a fully open opening in the present embodiment but not particularly limited to this) since the extent of refrigerant being retained in the indoor heat exchanger 41 is low (flow is easy). Due to this, it is possible to increase the extent of refrigerant being retained in the indoor heat exchanger 41.

Here, the predetermined fifth opening degree is set to be smaller than the predetermined fourth opening degree since the extent of refrigerant excessively passing through the indoor heat exchanger 41 is smaller in a case where the fifth condition is satisfied compared to a case where the fourth condition is satisfied.

Here, there is no adjusting so as to exceed the adjustable range of the degree of opening of the indoor expansion valve 43 in any of the processes described above.

The indoor control section 40 performs the processes as above according to the condition which is satisfied in step S20 and the flow moves to step S40.

In step S40, the indoor control section 40 determines whether or not lower limit opening degree for the degree of opening for control of the indoor expansion valve 43 is no longer being carried out. In detail, it is determined whether or not the lower limit opening degree which is set is a lower limit for the adjustable range of the degree of opening of the indoor expansion valve 43 (whether or not the lower limit opening degree is invalid) by performing a process in a case where the fourth condition is satisfied or a process in a case where the fifth condition is satisfied in step S30 as described above. The flow reverts to step S20 in a case where the lower limit opening degree of the indoor expansion valve 43 is not invalid. In addition, the flow reverts to step S10 in a case where the lower limit opening degree of the indoor expansion valve 43 is invalid since there is a state where it is difficult for there to be the degree of subcooling of refrigerant flowing through the liquid side of the indoor heat exchanger 41 due to, for example, starting of cooling operation or the like in the refrigerant circuit 10. Here, in a state where the flow reverts to step S10, it is possible to change the degree of opening of the indoor expansion valve 43 to be sufficiently constricted in order for the degree of subcooling of refrigerant flowing through the gas side of the indoor heat exchanger 41 to be maintained at the indoor target subcooling since the lower limit opening degree of the indoor expansion valve 43 is invalid.

The indoor control section 40 performs control of the degree of opening of the indoor expansion valve 43 as above.

(4) Characteristics of Air Conditioner

In the air conditioner 1, it is not possible for the indoor control section 40 to obtain information which indicates the cooling operation state or the heating operation state from the outdoor control section 20. However, the indoor control section 40 performs control of the valve opening degree of the indoor expansion valve 43 in such a way that the degree of superheat of refrigerant flowing through the gas side of the indoor heat exchanger 41 becomes the indoor target superheat irrespective of cooling operation or heating operation. Here, in a state of being switched to the heating state, the degree of superheat of refrigerant flowing through the gas side of the indoor heat exchanger 41 is raised since heat is not released from refrigerant which is discharged from the compressor 21 and the refrigerant is sent on practically without any change on the gas side of the indoor heat exchanger 41. Accordingly, the indoor control section 40 performs control of the degree of opening of the indoor expansion valve 43 to raise the opening degree of the indoor expansion valve 43 in order to the degree of superheat of refrigerant flowing through the gas side of the indoor heat exchanger 41 where the degree of superheat is excessively raised, is lowered. Due to this, it is easy for abnormal increases in the pressure of refrigerant at the gas side of the indoor heat exchanger 41 to be suppressed even when switching from cooling operation to heating operation.

Moreover, the indoor control section 40 performs control of the valve opening degree of the indoor expansion valve 43 in such a way that the degree of superheat of refrigerant flowing through the gas side of the indoor heat exchanger 41 becomes the indoor target superheat as described above and controls in such a way that the indoor expansion valve 43 is in a state of being fully open by setting the lower limit opening degree to the maximum to the adjustable range of the degree of opening of the indoor expansion valve 43 in a case where satisfying of either the pressure detected by the indoor heat exchange gas side refrigerant pressure sensor 61 exceeding the predetermined pressure or the degree of subcooling of refrigerant flowing through the outlet on the liquid side of the indoor heat exchanger 41 being higher than predetermined first subcooling is ascertained. Due to this, it is possible to more reliably suppress abnormal increases in the pressure of refrigerant at the gas side of the indoor heat exchanger 41.

Furthermore, the indoor control section 40 performs correction to the lower limit opening degree of the indoor expansion valve 43, which is set, according to the degree of subcooling of refrigerant at the liquid side of the indoor heat exchanger 41. That is, by performing correction to raise the lower limit opening degree of the indoor expansion valve 43 in a case where the degree of subcooling of refrigerant at the liquid side of the indoor heat exchanger 41 becomes excessively high, it is possible to eliminate a state where it is easy for refrigerant which is retained in the indoor heat exchanger 41 to flow out and the degree of subcooling becomes excessively high due to it being easy for the valve opening degree of the indoor expansion valve 43 to become large (corresponding to the processes in a case where the second condition or the third condition is satisfied). In addition, by performing correction to lower the lower limit opening degree of the indoor expansion valve 43 in a case where the degree of subcooling of refrigerant at the liquid side of the indoor heat exchanger 41 becomes excessively small, it is possible to eliminate a state where it is easy for refrigerant to be retained in the indoor heat exchanger 41 and the degree of subcooling becomes excessively low due to it being easy for the valve opening degree of the indoor expansion valve 43 to become small (corresponding to the processes in a case where the fourth condition or the fifth condition is satisfied).

(5) Modified Examples (5-1) Modified Example A

The embodiment described above is described with an example of a case where the lower limit opening degree is set in such a way that the indoor expansion valve 43 is in a state of being fully open in a case where either the pressure detected by the indoor heat exchange gas side refrigerant pressure sensor 61 exceeding the predetermined pressure or the degree of subcooling of refrigerant flowing through the outlet on the liquid side of the indoor heat exchanger 41 being higher than predetermined first subcooling is satisfied.

However, without the case where the lower limit opening degree is set in such a way that the indoor expansion valve 43 is in a state of being fully open being limited to this, the lower limit opening degree may be set in such a way that the indoor expansion valve 43 is in a state of being fully open in a case where, for example, only the condition that the pressure detected by the indoor heat exchange gas side refrigerant pressure sensor 61 exceeds a specific pressure is satisfied. In addition, the lower limit opening degree may be set in such a way that the indoor expansion valve 43 is in a state of being fully open in a case where, for example, only the condition that the degree of subcooling of refrigerant flowing through the outlet on the liquid side of the indoor heat exchanger 41 is higher than specific the degree of subcooling is satisfied.

(5-2) Modified Example B

The embodiment described above is described with an example of a case of control where the lower limit opening degree of the indoor expansion valve 43 is raised in a case where the degree of subcooling of refrigerant flowing through the outlet on the liquid side of the indoor heat exchanger 41 is higher than predetermined second subcooling or higher than predetermined third subcooling.

However, without the case where control is performed in such a way that the lower limit opening degree of the indoor expansion valve 43 is raised being limited to this, control may be performed in such a way that the lower limit opening degree of the indoor expansion valve 43 is raised in a case where, for example, the pressure detected by the indoor heat exchange gas side refrigerant pressure sensor 61 exceeds a specific pressure (which may be the same as or different to the value in modified example A).

(5-3) Modified Example C

The embodiment described above is described with an example of a case where the pressure detected by the indoor heat exchange gas side refrigerant pressure sensor 61 is used in setting the lower limit opening degree of the indoor expansion valve 43 and the like.

However, instead of using the pressure detected by the indoor heat exchange gas side refrigerant pressure sensor 61 in setting the lower limit opening degree of the indoor expansion valve 43 and the like, the pressure of refrigerant flowing through the gas side of the indoor heat exchanger 41 may be estimated using the temperature detected by the indoor heat exchange gas side temperature sensor 60. Without the estimation method being particularly limited, for example, the saturation pressure corresponding to the temperature detected by the indoor heat exchange gas side temperature sensor 60 may be the estimate for the pressure of refrigerant flowing through the gas side of the indoor heat exchanger 41.

(5-4) Modified Example D

The embodiment described above is described with an example of a case where each type of control for heating operation is performed by detecting increases in the pressure detected by the indoor heat exchange gas side refrigerant pressure sensor 61 and increases in the degree of subcooling of refrigerant flowing through the outlet on the liquid side of the indoor heat exchanger 41.

However, performing each type of control for heating operation is not limited to this and each type of control for heating operation may be performed by, for example, detecting changes in the relationship in the temperature of refrigerant before and after the indoor expansion valve 43.

Figure 4:
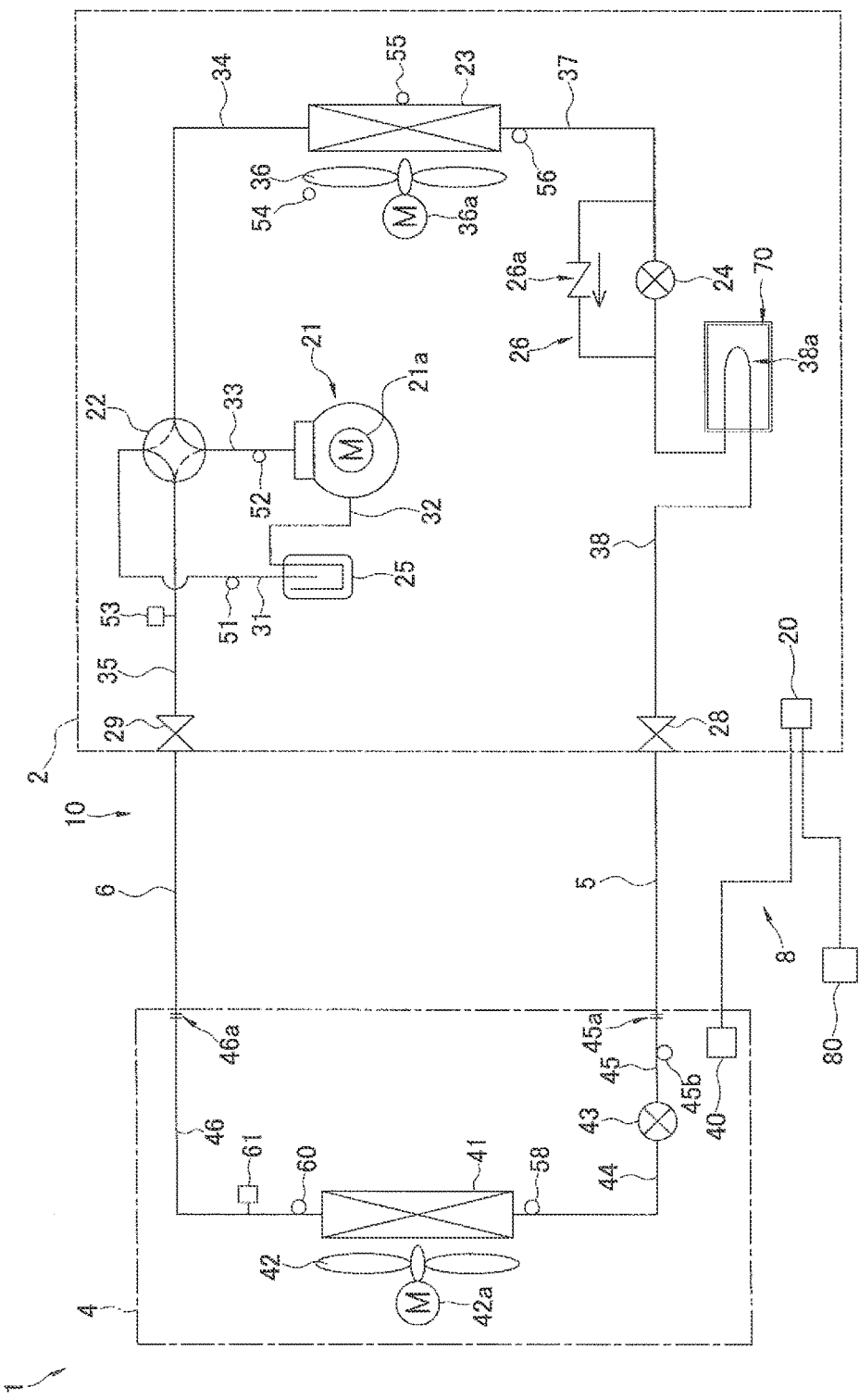
FIG. 4 is an outline configuration diagram of an air conditioner according to modified example (D).
Figure 5:
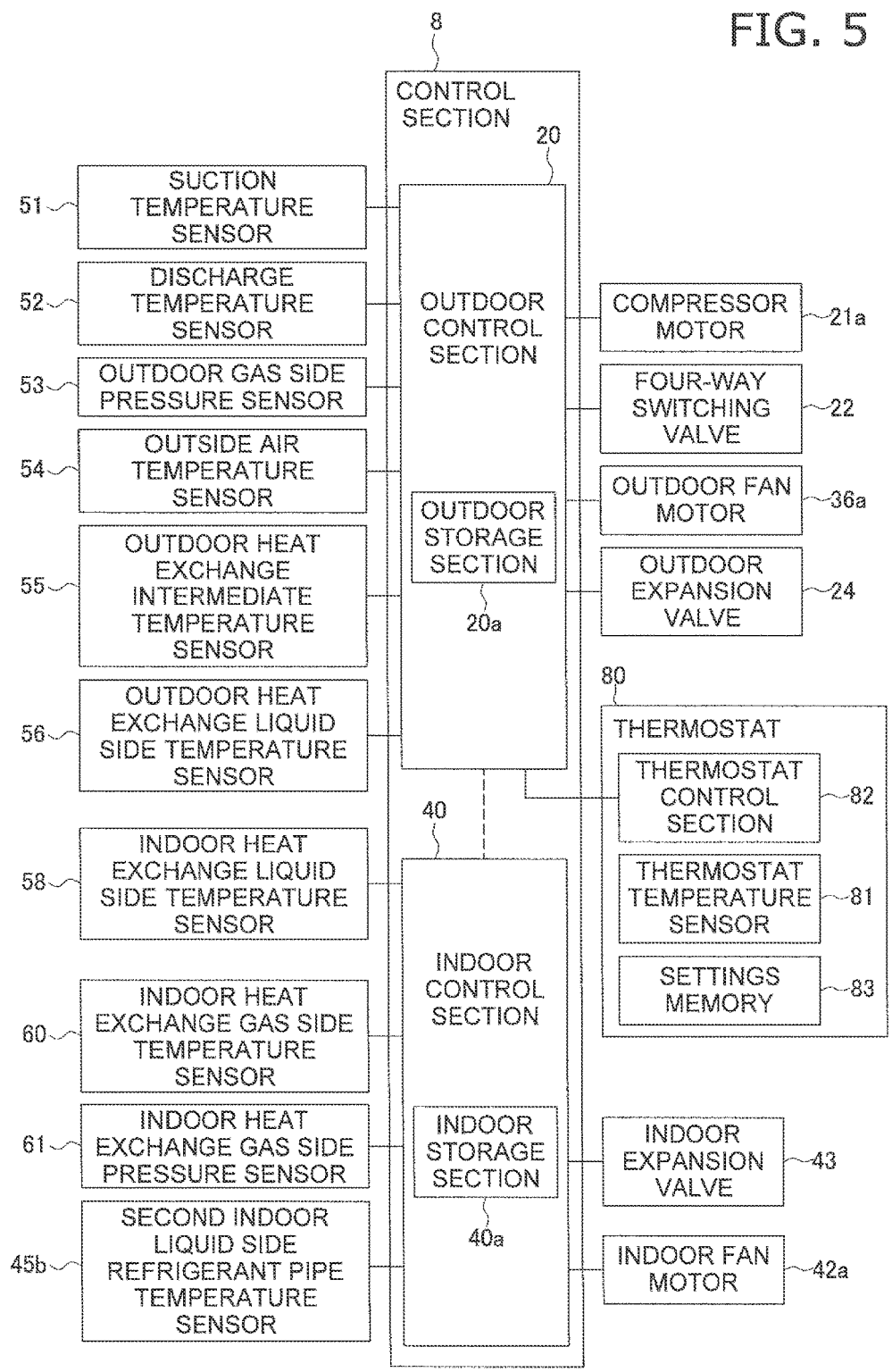
FIG. 5 is a control block diagram for the air conditioner according to modified example (D).

In this case, for example, there may be further provided a second indoor liquid side refrigerant pipe temperature sensor 45b which detects the temperature of refrigerant flowing through the second indoor liquid side refrigerant pipe 45 which extends from the indoor expansion valve 43 to the outdoor side as shown in FIG. 4 and FIG. 5. Then, various types of control for heating operation may be performed by detecting changes in the relationship between the temperature detected by the second indoor liquid side refrigerant pipe temperature sensor 45b and the temperature detected by the indoor heat exchange liquid side temperature sensor 58. In detail, the relationship between the temperature detected by the second indoor liquid side refrigerant pipe temperature sensor 45b and the temperature detected by the indoor heat exchange liquid side temperature sensor 58 is a relationship where the temperature detected by the second indoor liquid side refrigerant pipe temperature sensor 45b is higher than the temperature detected by the indoor heat exchange liquid side temperature sensor 58 during cooling operation and is a relationship the temperature detected by the second indoor liquid side refrigerant pipe temperature sensor 45b is lower than the temperature detected by the indoor heat exchange liquid side temperature sensor 58 during heating operation. The indoor control section 40 may perform correction or the like where it is determined that the predetermined condition is satisfied by detecting changes in this relationship and the lower limit opening degree of the indoor expansion valve 43 is set or the lower limit opening degree of the indoor expansion valve 43 is raised.

(5-5) Modified Example E

The embodiment described above and modified example D are described with an example of performing control of the degree of opening of the indoor expansion valve 43 by setting the lower limit opening degree in a case where the predetermined condition is satisfied.

In contrast to this, control which is performed in a case where the predetermined condition is satisfied is not limited to control of the degree of superheat in the indoor expansion valve 43 by setting the lower limit opening degree in the indoor expansion valve 43.

For example, the indoor control section 40 may use a degree of opening, which is obtained by consistently raising the degree of opening of the indoor expansion valve 43 in a case where the degree of superheat is controlled (a degree of opening of the indoor expansion valve 43 in a case of control such that the degree of superheat of refrigerant on the gas side of the indoor heat exchanger 41 is maintained at predetermined indoor target superheat) by a predetermined opening degree, as the degree of opening for control of the indoor expansion valve 43 in a case where the predetermined condition is satisfied.

In addition, for example, the indoor control section 40 may use a degree of opening, which is obtained by correcting so as to raise the degree of opening of the indoor expansion valve 43 in a case where the degree of superheat is controlled (a degree of opening of the indoor expansion valve 43 in a case of control such that the degree of superheat of refrigerant on the gas side of the indoor heat exchanger 41 is maintained at predetermined indoor target superheat) as this the degree of superheat is higher, as the degree of opening for control of the indoor expansion valve 43 in a case where the predetermined condition is satisfied.

(5-6) Modified Example F

The embodiment described above is described with an example of a case where the outdoor expansion valve 24 is an electric expansion valve which is able to be controlled.

However, the outdoor expansion valve 24 is not limited to being configured using an electric expansion valve and may be configured using, for example, so-called a heat sensing type of expansion valve. In this case, although not limited to this, the valve opening degree of the heat sensing type of expansion valve may be adjusted so as to be similar to the embodiment described above by, for example, sensing the temperature of refrigerant in the gas and liquid separator introduction pipe 31.

What is claimed is:

1. An indoor unit of an air conditioner, the air conditioner having the indoor unit and an outdoor unit, the indoor unit not obtaining information indicating a cooling operation state or a heating operation state from the outdoor unit, and the air conditioner being switchable between the cooling operation state and the heating operation state, the indoor unit comprising:
    an indoor heat exchanger;
    an indoor expansion valve connected to a liquid refrigerant side of the indoor heat exchanger and not electrically connected to the outdoor unit;
    a first information ascertaining section configured to ascertain a degree of superheat of refrigerant flowing through a gas refrigerant side of the indoor heat exchanger:
    a second information ascertaining section configured to ascertain at least one of
        a pressure of refrigerant flowing through the gas refrigerant side of the indoor heat exchanger,
        a degree of subcooling of refrigerant flowing through the liquid refrigerant side of the indoor heat exchanger,
        a pair of the temperatures including a temperature on one side of the indoor expansion valve and a temperature on an other side of the indoor expansion valve; and
    an indoor control section having a first control mode and a second control mode, the second control mode being performed in a case when information ascertained by the second information ascertaining section satisfies a predetermined condition,
    in the first control mode, the indoor control section controlling an opening degree of the indoor expansion valve so that the degree of superheat satisfies a predetermined superheat condition, and
    in the second control mode, the indoor control section controlling
        the opening degree of the indoor expansion valve using a modified first control mode by setting a lower limit opening degree, which narrows an adjustable range of the opening degree of the indoor expansion valve in the first control mode while continuing to control the opening degree of the indoor expansion valve so that the degree of superheat satisfies the superheat condition.

2. The indoor unit of the air conditioner according to claim 1, wherein
    the indoor control section controls the opening degree of the indoor expansion valve in the second control mode using the modified first control mode by setting the lower limit opening degree, which narrows the adjustable range of the opening degree of the indoor expansion valve in the first control mode.

3. The indoor unit of the air conditioner according to claim 2, wherein
    the indoor control section stipulates a size of the lower limit opening degree set in the second control mode according to information ascertained by the second information ascertaining section.

4. The indoor unit of the air conditioner according to claim 1, wherein
    the second information ascertaining section has a subcooling ascertaining section configured to ascertain the degree of subcooling of refrigerant flowing through the liquid refrigerant side of the indoor heat exchanger, and
    the indoor control section
        determines that the predetermined condition is satisfied when the degree of subcooling of refrigerant flowing through the liquid refrigerant side of the indoor heat exchanger, which is ascertained by the subcooling ascertaining section, is higher than a predetermined condition subcooling, and
        in the second control mode, which is performed when it is determined that the predetermined condition is satisfied,
            controls the opening degree of the indoor expansion valve such that the opening degree is larger than the opening degree of the indoor expansion valve when controlled using the first control mode or
            controls the opening degree of the indoor expansion valve using the modified first control mode by setting the lower limit opening degree, which narrows the adjustable range of the opening degree of the indoor expansion valve in the first control mode.

5. The indoor unit of the air conditioner according to claim 4, wherein
    the indoor control section performs a correction to lower a set value of the lower limit opening degree when the degree of subcooling of refrigerant flowing through the liquid refrigerant side of the indoor heat exchanger ascertained by the subcooling ascertaining section is smaller than a predetermined correction subcooling when performing the second control mode and the opening degree of the indoor expansion valve is controlled using the modified first control mode by setting the lower limit opening degree, which narrows the adjustable range of the opening degree of the indoor expansion valve in the first control mode, and
    the predetermined correction subcooling is smaller than the predetermined condition subcooling.

6. The indoor unit of the air conditioner according to claim 1, wherein
    the second information ascertaining section has a gas side refrigerant pressure sensor, which detects the pressure of refrigerant flowing through the gas refrigerant side of the indoor heat exchanger, and
    the indoor control section
        determines that the predetermined condition is satisfied when the pressure of refrigerant detected by the gas side refrigerant pressure sensor exceeds a predetermined pressure, and
        in the second control mode, which is performed when it is determined that the predetermined condition is satisfied,
            controls the opening degree of the indoor expansion valve such that the opening degree is larger than the opening degree of the indoor expansion valve when controlled using the first control mode or
            controls the opening degree of the indoor expansion valve using the modified first control mode by setting the lower limit opening degree, which narrows the adjustable range of the opening degree of the indoor expansion valve in the first control mode.

7. The indoor unit of the air conditioner according to claim 6, further comprising:
a subcooling ascertaining section configured to ascertain the degree of subcooling of refrigerant flowing through the liquid refrigerant side of the indoor heat exchanger,
the indoor control section performing a correction to lower a set value of the lower limit opening degree when the degree of subcooling of refrigerant flowing through the liquid refrigerant side of the indoor heat exchanger, which is ascertained by the subcooling ascertaining section, is smaller than a predetermined correction subcooling when performing the second control mode and the opening degree of the indoor expansion valve is controlled using the modified first control mode by setting the lower limit opening degree, which narrows the adjustable range of the opening degree of the indoor expansion valve in the first control mode.

8. The indoor unit of the air conditioner according to claim 1, wherein
the second information ascertaining section has
a gas side refrigerant pressure sensor, which detects the pressure of refrigerant flowing through the gas refrigerant side of the indoor heat exchanger and
a subcooling ascertaining section configured to ascertain the degree of subcooling of refrigerant flowing through the liquid refrigerant side of the indoor heat exchanger, and
the indoor control section performs the second control mode when determining that the predetermined condition is satisfied when either
the pressure detected by the gas side refrigerant pressure sensor exceeds a predetermined pressure or
the degree of subcooling of refrigerant flowing through the liquid refrigerant side of the indoor heat exchanger ascertained by the subcooling ascertaining section is higher than a predetermined condition subcooling.

9. The indoor unit of the air conditioner according to claim 8, wherein
the indoor control section fully opens the indoor expansion valve when the predetermined condition is satisfied.

10. The indoor unit of the air conditioner according to claim 9, wherein
the indoor control section lowers a set value of the lower limit opening degree when the degree subcooling of refrigerant flowing through the liquid refrigerant side of the indoor heat exchanger, which is ascertained by the subcooling ascertaining section, is smaller than a predetermined correction subcooling in a state when the indoor expansion valve is fully open.

11. The indoor unit of the air conditioner according to claim 1, wherein
the first information ascertaining section has
a gas side refrigerant pressure sensor, which detects the pressure of refrigerant flowing through the gas refrigerant side of the indoor heat exchanger and
a gas side refrigerant temperature sensor, which detects the temperature of refrigerant flowing through an outlet on the gas refrigerant side of the indoor heat exchanger, and
the indoor control section calculates a value, which is obtained by subtracting a refrigerant saturation temperature corresponding to a refrigerant saturation pressure detected by the gas side refrigerant pressure sensor from the temperature of refrigerant detected by the gas side refrigerant temperature sensor, as the degree of superheat of refrigerant flowing through the gas refrigerant side of the indoor heat exchanger.

12. The indoor unit of the air conditioner according to claim 1, further comprising:
a superheat condition storage section, which stores the predetermined superheat condition,
the indoor control section controls the opening degree of the indoor expansion valve in the first control mode so that the degree of superheat of refrigerant flowing through the gas refrigerant side of the indoor heat exchanger satisfies the predetermined superheat condition stored in the superheat condition storage section.

13. An indoor unit of an air conditioner, the air conditioner having the indoor unit and an outdoor unit, the indoor unit not obtaining information indicating a cooling operation state or a heating operation state from the outdoor unit, and the air conditioner being switchable between the cooling operation state and the heating operation state, the indoor unit comprising:
an indoor heat exchanger,
an indoor expansion valve connected to a liquid refrigerant side of the indoor heat exchanger and not electrically connected to the outdoor unit;
a first information ascertaining section configured to ascertain a degree of superheat of refrigerant flowing through a gas refrigerant side of the indoor heat exchanger;
a second information ascertaining section configured to ascertain at least one of
a pressure of refrigerant flowing through the gas refrigerant side of the indoor heat exchanger,
a degree of subcooling of refrigerant flowing through the liquid refrigerant side of the indoor heat exchanger,
a pair of the temperatures including a temperature on one side of the indoor expansion valve and a temperature on an other side of the indoor expansion valve; and
an indoor control section having a first control mode and a second control mode, the second control mode being performed in a case when information ascertained by the second information ascertaining section satisfies a predetermined condition,
in the first control mode, the indoor control section controlling an opening degree of the indoor expansion valve so that the degree of superheat satisfies a predetermined superheat condition, and
in the second control mode, the indoor control section controlling
the opening degree of the indoor expansion valve such that the opening degree is larger than the opening degree of the indoor expansion valve when controlled using the first control mode while continuing to control the opening degree of the indoor expansion valve so that the degree of superheat satisfies the predetermined superheat condition.

* * * * *